US010391716B2

(12) United States Patent
Mankowski et al.

(10) Patent No.: US 10,391,716 B2
(45) Date of Patent: Aug. 27, 2019

(54) ARTICULATING VACUUM PLATE SYSTEM AND RELATED METHOD

(71) Applicant: Genesis, LLC, Grand Rapids, MI (US)

(72) Inventors: John P. Mankowski, Fall City, WA (US); William J. Kuiper, Hudsonville, MI (US)

(73) Assignee: Grotown VI, LLC, Grand Rapids, MI (US)

( * ) Notice: Subject to any disclaimer, the term of this patent is extended or adjusted under 35 U.S.C. 154(b) by 399 days.

(21) Appl. No.: 15/388,137

(22) Filed: Dec. 22, 2016

(65) Prior Publication Data

US 2017/0182686 A1    Jun. 29, 2017

Related U.S. Application Data

(60) Provisional application No. 62/387,242, filed on Dec. 23, 2015.

(51) Int. Cl.
*B29C 65/14*    (2006.01)
*B29C 65/18*    (2006.01)
(Continued)

(52) U.S. Cl.
CPC ............ *B29C 65/14* (2013.01); *B29C 51/087* (2013.01); *B29C 51/10* (2013.01); *B29C 51/22* (2013.01);
(Continued)

(58) Field of Classification Search
CPC ... B29C 65/14; B29C 66/843; B29C 66/8322; B29C 51/266; B29C 51/261;
(Continued)

(56) References Cited

U.S. PATENT DOCUMENTS

| 2,968,064 A | 1/1961 | Howell |
| 3,371,382 A | 3/1968 | Ciraud |

(Continued)

FOREIGN PATENT DOCUMENTS

| CA | 2026975 | 4/1992 |
| FR | 2184486 | 12/1973 |

(Continued)

*Primary Examiner* — Christopher T Schatz
*Assistant Examiner* — Cynthia L Schaller
(74) *Attorney, Agent, or Firm* — Warner Norcross + Judd LLP

(57) ABSTRACT

An apparatus and related method of utilizing articulating vacuum plates to manipulate a film or polymeric sheet and form a three dimensional article is provided. The apparatus can be in the form of an articulating vacuum plate system which includes one or more plates or mold parts that are configured to support a sheet, constructed for example, from a polymeric film, in a two dimensional configuration or a three dimensional configuration in a first mode. The apparatus is constructed so that the plates and/or mold parts can articulate or move so as to reconfigure the sheet from a generally planar configuration into a second three dimensional configuration in a second mode for further forming, optionally while the plates and/or mold parts apply vacuum to the sheet while the plates and/or mold parts articulate, so that the plates and/or mold parts bend or otherwise manipulate the configuration and shape of the sheet.

18 Claims, 18 Drawing Sheets

(51) Int. Cl.
*B29C 65/78* (2006.01)
*B29C 65/00* (2006.01)
*B29C 51/08* (2006.01)
*B29C 51/10* (2006.01)
*B29C 51/22* (2006.01)
*B29C 51/26* (2006.01)
*B29K 23/00* (2006.01)
*B29K 25/00* (2006.01)
*B29K 77/00* (2006.01)

(52) U.S. Cl.
CPC .......... *B29C 51/261* (2013.01); *B29C 51/266* (2013.01); *B29C 65/18* (2013.01); *B29C 65/7847* (2013.01); *B29C 65/7891* (2013.01); *B29C 66/1122* (2013.01); *B29C 66/4326* (2013.01); *B29C 66/73921* (2013.01); *B29C 66/8322* (2013.01); *B29C 66/843* (2013.01); *B29C 66/8432* (2013.01); *B29C 66/71* (2013.01); *B29C 66/723* (2013.01); *B29C 2791/006* (2013.01); *B29K 2023/06* (2013.01); *B29K 2023/12* (2013.01); *B29K 2025/00* (2013.01); *B29K 2025/06* (2013.01); *B29K 2077/00* (2013.01)

(58) Field of Classification Search
CPC ....... B29C 51/22; B29C 51/10; B29C 51/087; B29C 66/73921; B29C 66/8432; B29C 66/4326; B29C 65/18; B29C 65/7891; B29C 66/1122; B29C 65/7847; B29C 66/71; B29C 66/723; B29C 2791/006; B29K 2025/06; B29K 2077/00; B29K 2023/06; B29K 2023/12; B29K 2025/00
See application file for complete search history.

(56) References Cited

U.S. PATENT DOCUMENTS

| | | | |
|---|---|---|---|
| 3,574,807 A | | 4/1971 | Heavener |
| 3,622,418 A | | 11/1971 | Black et al. |
| 3,853,449 A | | 12/1974 | Houghton |
| 3,873,659 A | | 3/1975 | Smith |
| 4,187,273 A | | 2/1980 | Stratis |
| 4,483,702 A | * | 11/1984 | Frank .................. C03B 23/0357 294/188 |
| 4,662,925 A | * | 5/1987 | Thimons ............. C03B 23/0302 294/65 |
| 4,975,236 A | | 12/1990 | MacLachlan |
| 5,350,473 A | | 9/1994 | Weder et al. |
| 5,980,231 A | | 11/1999 | Arends et al. |
| 6,063,326 A | | 5/2000 | Kotha et al. |
| 6,474,975 B2 | | 11/2002 | Bibeau |

FOREIGN PATENT DOCUMENTS

| | | |
|---|---|---|
| GB | 2187132 | 9/1987 |
| GB | 2481931 | 1/2012 |

* cited by examiner

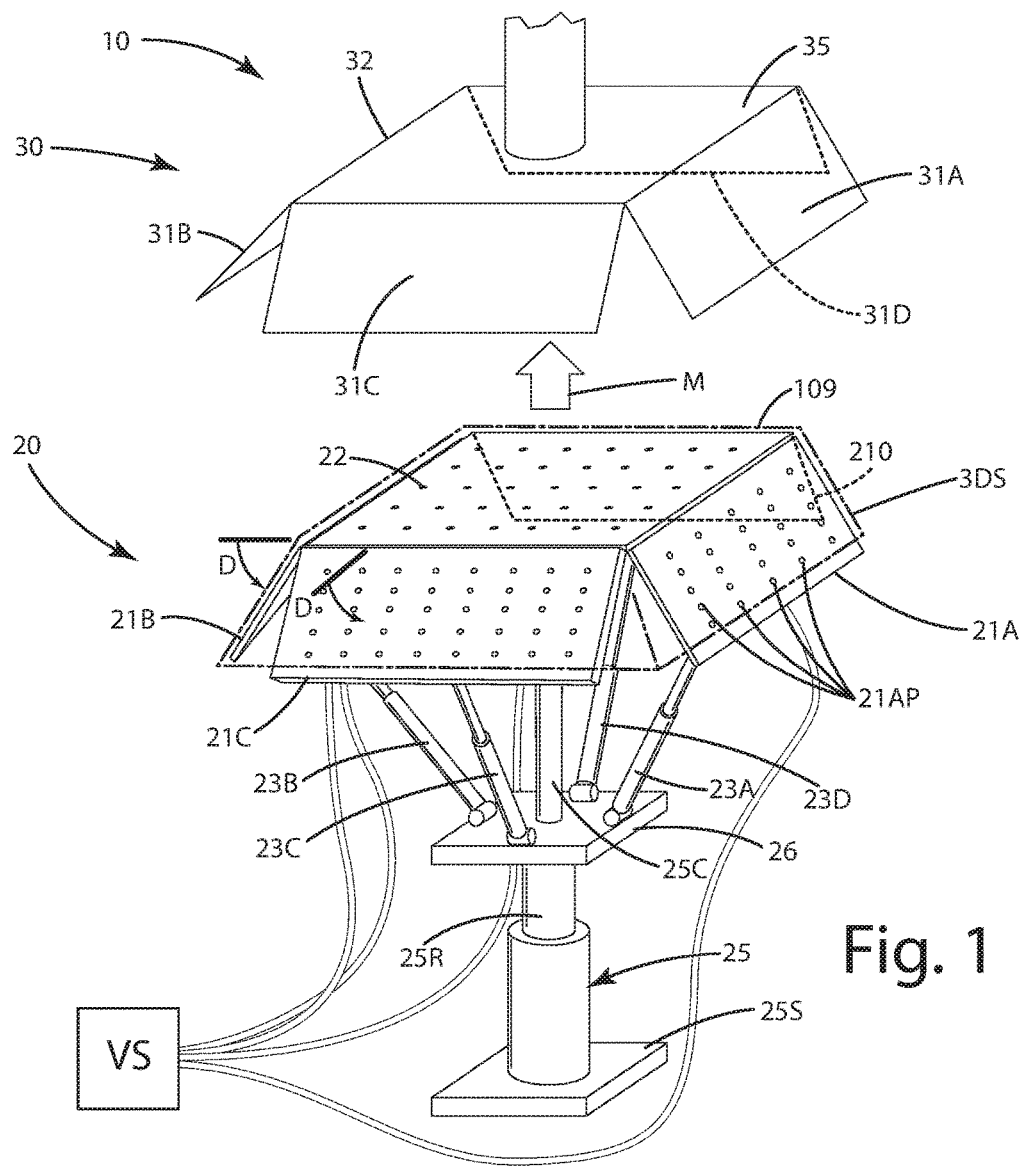
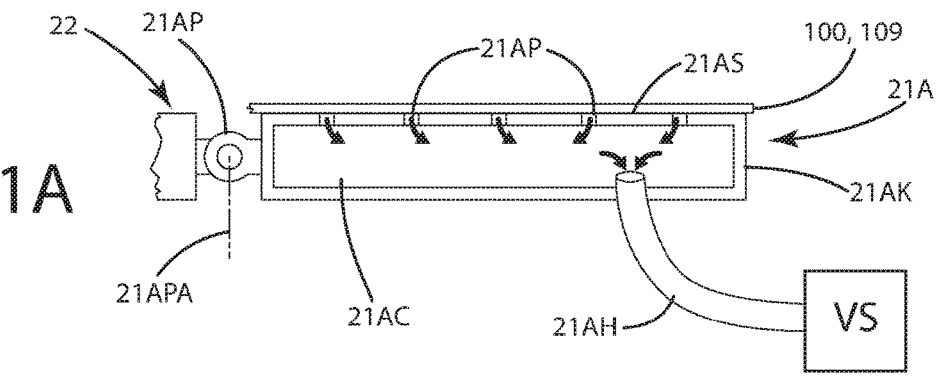
Fig. 1
Fig. 1A

ARTICULATING VACUUM PLATE SYSTEM AND RELATED METHOD

BACKGROUND OF THE INVENTION

The present invention relates to vacuum systems, and more particularly to an apparatus and related method of utilizing articulating vacuum plates to manipulate a film or polymeric sheet and form a three dimensional article.

There are many forming systems designed to thermal vacuum form two dimensional, flat polymeric sheets into three dimensional finished products. As an example, certain packaging can be thermoformed by heating a plastic sheet. A vacuum is drawn through multiple ports in a fixed, contoured mold. The vacuum draws the heated (and thus more pliable) sheet to conform the sheet to three dimensional contours of the mold. After satisfactory contact between the sheet and mold is achieved, the vacuum is discontinued and the now formed packaging is allowed to cool. Thereafter, the three dimensionally formed packaging is removed from the contoured mold and in some cases further processed.

While this works for certain thermally deformable materials and sheets, it does not work for certain films that have a high melting or deformation temperature. It also does not work for sheets of polymeric film that are thin and very flexible, but that need to be held in place during the forming process. In some cases, it is not desirable to heat or thermally alter certain types of sheets of films during a forming process; in which case the above type of vacuum forming does not work particularly well.

Accordingly, there remains room for improvement in the field of forming polymeric films and/or sheets into three dimensional articles.

SUMMARY OF THE INVENTION

An apparatus and related method of utilizing articulating vacuum plates to manipulate a film or polymeric sheet and form a three dimensional article is provided.

In one embodiment, the apparatus is in the form of an articulating vacuum plate system. The apparatus can include one or more plates or mold parts that are configured to support a sheet, constructed for example from a polymeric film, in a two dimensional configuration in a first mode. The apparatus is constructed so that the plates and/or mold parts can articulate or move so as to reconfigure the sheet from a generally planar configuration into a three dimensional configuration in a second mode for further forming.

In a further embodiment, the apparatus can include one or more plates or mold parts that are configured to support a sheet, constructed for example from a polymeric film, in a first three dimensional configuration in a first mode. The apparatus is constructed so that the plates and/or mold parts can articulate or move so as to reconfigure the sheet from the first three dimensional configuration into a second three dimensional configuration in a second mode for further forming.

In another embodiment, the apparatus can include plates that define vacuum ports in respective contact surfaces of the plates through which a vacuum is drawn to engage and/or hold the sheet against and/or near the respective contact surfaces. The plates can be configured so that they are movable relative to one another and/or another stationary plate, which may or may not include vacuum ports to hold the film. In some cases, the plates articulate, pivot, rotate and/or otherwise move relative to one another and/or the stationary plate.

In still another embodiment, the apparatus can include a contoured mold having a three dimensional net shape disposed adjacent the first and second vacuum plates and adapted to selectively receive at least a portion of the first vacuum plate and/or the second vacuum plate while the film is held against the same via a vacuum.

In even another embodiment, the apparatus can include a contoured mold in the form of a box-shaped hood having a three dimensional net shape so that as the film enters the box-shaped hood, it becomes at least partially trapped between the first and second vacuum plates and the box-shaped hood. Optionally, the hood is disposed adjacent, for example, above the first and second vacuum plates when in the first mode. The hood can be configured to receive at least portions of the plates and film when moved.

In yet another embodiment, the apparatus can include a bonding element, optionally in the form of a heating element. The film can include one or more edges that overlap one another when the film is located between the plates and the hood. The bonding element can bond those overlapped edges to one another to form a corner of the three dimensional form.

In a further embodiment, the bonding element can be in the form of a heating element that applies heat to preselected ones of the edges to perform the bonding. In some cases the edges can partially melt and bond with one another on a physical and molecular level. Optionally, the heating element is a heated bar that is pressed toward and against the film in a gap defined between adjacent plates and/or the hood.

In still a further embodiment, the method includes providing a first vacuum plate and a second vacuum plate; loading the film on the first and/or second vacuum plates in a first mode so that the film is adjacent a two dimensional surface and so that the film is in a generally planar, two dimensional form; applying a vacuum to draw the sheet toward the two dimensional surface; and articulating at least one of the first and second vacuum plates relative to the other, and/or relative to a base plate, so that the plates cooperatively transition to a second mode in which the film transitions from the generally planar, two dimensional form to a three dimensional form, while the vacuum continues to be applied.

In still yet a further embodiment, the method includes providing a first vacuum plate and a second vacuum plate; loading the film on the first and/or second vacuum plates in a first mode so that the film is adjacent a three dimensional surface of the first and/or second vacuum plates and so that the film is in a first dimensional configuration in a first mode; applying a vacuum to draw the sheet toward the three dimensional surface; and articulating at least one of the first and second vacuum plates relative to the other, and/or relative to a base plate, so that the plates cooperatively transition to a second mode in which the film transitions from the first three dimensional configuration to a second three dimensional form, while the vacuum continues to be applied.

In even a further embodiment, the method includes moving the film on the first and second vacuum plates relative to a contoured mold in the form of a box-shaped hood having a three dimensional net shape and engaging the film against an interior of the box-shaped hood to configure the film into the three dimensional net shape. Optionally, the three dimensional net shape can be in the form of a litter sieve and/or litter sieve base, for use in conjunction with an animal litter box.

In yet a further embodiment, the method can utilize a film in the form of a sheet having two or more edges. The two or more edges can be overlapped when the film is in the three dimensional net shape. Optionally, the method can include applying heat to the two or more edges to bond the edges together and form a corner of the three dimensional article.

The current embodiments of the apparatus and related method of utilizing articulating vacuum plates to manipulate a film or polymeric sheet and form a three dimensional article provide benefits in forming that previously have been unachievable. For example, the utilization of multiple, articulating vacuum plates, which can each exert a vacuum on the film, enables the apparatus to three dimensionally bend, flex, move or otherwise articulate the film so that it is urged toward and/or achieves a particular three dimensional shape. Where the plates are used in conjunction with a contoured mold, the multiple parts of the apparatus can efficiently and precisely form a desired three dimensional shape from a planar, two dimensional starting sheet, and or a first three dimensional starting configuration of the sheet. In the method, the sheet can be reconfigured, folded and/or bent from its starting planar form, or a first three dimensional form, into a myriad of three dimensional contours, depending on the shapes, contours and articulation of the respective vacuum plates relative to one another and other plates. Where the apparatus is constructed from multiple plates, extremely complex and innovative three dimensional forms can be created from a simple planar sheet of film.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a perspective view of the articulating vacuum plate system of a current embodiment, with respective vacuum plates articulating into a second mode, and a sheet of film transitioning from a two dimensional form to a three dimensional form;

FIG. 1A is a section view of vacuum plates of the system;

DESCRIPTION OF THE CURRENT EMBODIMENTS

Figure 2:
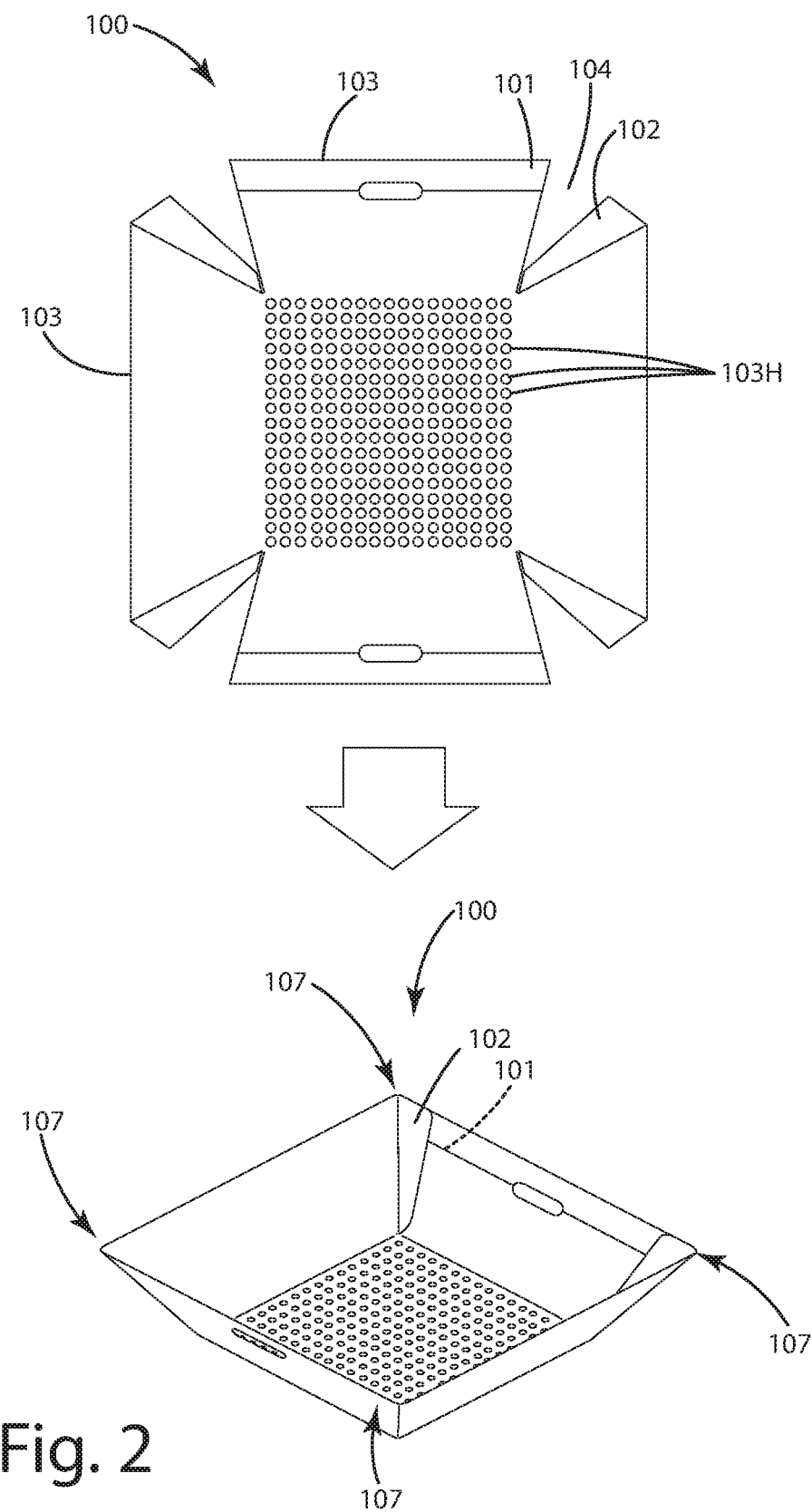
FIG. 2 is a perspective view of a two dimensional, planar sheet of film that is transformed by the apparatus and method of the current embodiment into a three dimensional net shape in the form of a box or other configuration.

A current embodiment of the articulating vacuum plate system and related method is illustrated in FIGS. 1 and 3-7, and generally designated 10. The articulating vacuum plate system or apparatus 10 can include multiple components, some of which can move relative to one another. The system 10 can include a first forming portion 20 and a second forming portion 30. The first forming portion 20 can include one or more articulating vacuum plates 21A, 21B, 21C, 21D. These vacuum plates can be movably joined with an optional base plate 22 and can articulate relative to the base plate and/or one another. The forming portion 20 can be further mounted to a primary movement mechanism 25, which is illustrated can be in the form of a hydraulic ram that moves the articulating vacuum plates and the base plate in direction M toward and/or away from the second forming portion 30. Each of the vacuum plates 21A, 21B, 21C and 21D can be independently movable via respective secondary movement mechanisms 23A, 23B, 23C and 23D which can articulate and move each of the respective vacuum plates relative to one another and/or the base or other components of the forming portion 20.

The second forming portion 30 can be in the form of a contoured mold which can be generally box shaped. As used herein, box shaped simply refers to a shape that resembles a box or other open chambered article. And while box shaped can refer to the rectangular or square walled box, the walls of such box optionally can be angled as shown or in the form of trapezoids or other shapes. Further the base can take on any desired shape, for example, square, rectangular, triangular, rounded, elliptical, polygonal or other shapes.

The contoured mold 32 of the second forming portion 30 can be in the form of a hood having a base 35 to which multiple walls 31A, 31B, 31C and 31D are joined. These walls can be fixed in a fixed orientation relative to the base 35. In some embodiments, these walls can be attached pivotally to the base and/or one another so that they can move and can be reconfigured in multiple orientations. The contoured mold 32 and its respective walls and base can form a three dimensional net shape.

Figure 3:
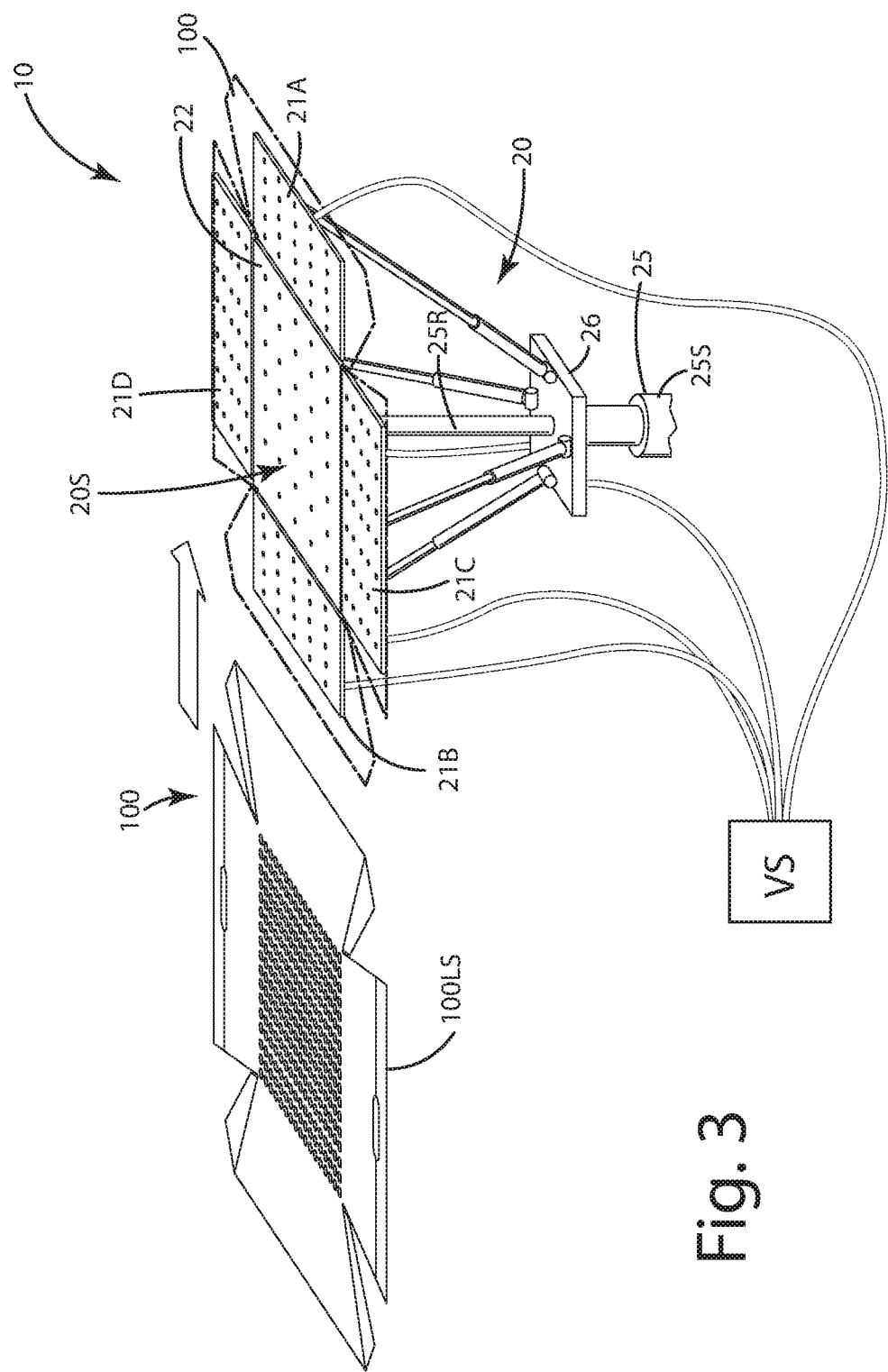
FIG. 3 is a perspective view of the articulating vacuum plate system in a first mode, where a flat planar two dimensional sheet of film is initially loaded onto one or more vacuum plates of the apparatus.
Figure 5:
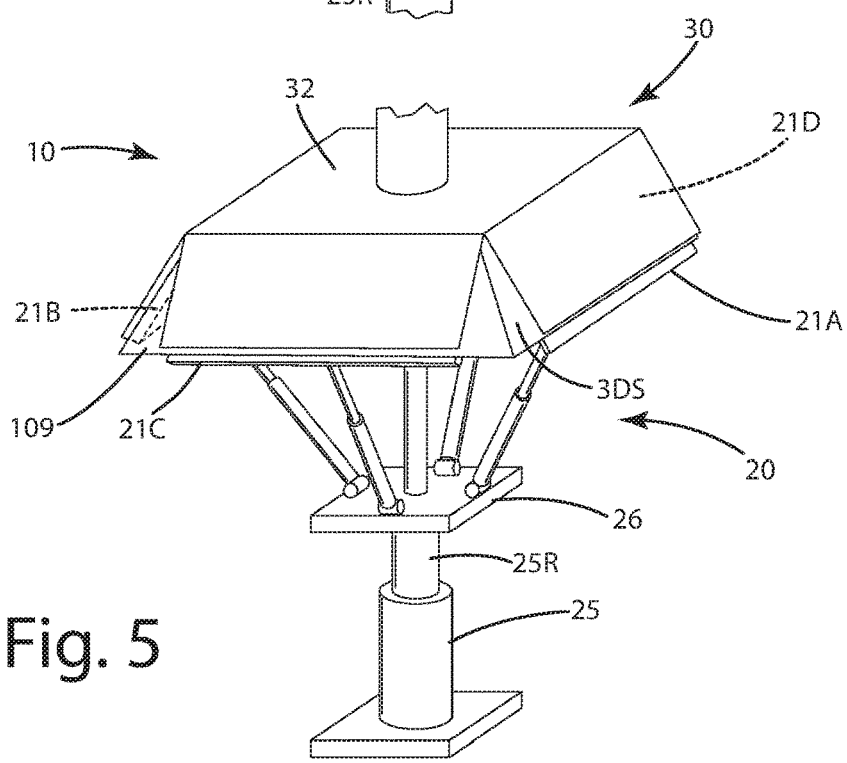
FIG. 5 is a perspective view of the articulating vacuum plate system with the film being moved into the contoured mold, along with the plates, which are disposed in the second mode, to thereby transfer a three dimensional net shape of the contoured mold and/or plates to the film located therebetween.

As noted above, the respective vacuum plates 21A, 21B, 21C and 21D can be configurable in a first mode, for example, that shown in FIG. 3 in which the vacuum plates cooperatively form a generally planar, two dimensional surface 2DS upon which the sheet of film 100 can be loaded in a generally flat planar two dimensional configuration. This two dimensional surface can correspond to a contact surface or vacuum surface of one or more plates that contacts the film and pulls it against the plates. The vacuum plates are also configurable in a second mode, for example, as shown in FIGS. 1 and 5, in which the vacuum plates are moved relative to one another and/or the base to form a generally three dimensional surface 3DS while the vacuum plates apply a vacuum therethrough to the film.

As a result, the sheet of film transitions from the generally planar two dimensional form, shown to the top of FIG. 2, to a three dimensional form, shown to the bottom of FIG. 2, under the forces applied to it via the vacuum ports. This in turn readies the sheet of film for engagement with the second forming portion 30 so that ultimately the sheet of film can be reconfigured from a planar configuration to a three dimensional net shape of a desired article.

As described herein, the current embodiments are well suited for manufacturing certain types of three dimensional articles, for example litter sieves for animal litter disposal systems, such as those described in U.S. Patent Application Publication US2015/0334983 to Kuiper, filed Apr. 22, 2015 as well as U.S. patent application Ser. No. 14/884,888 to Kuiper, filed Oct. 16, 2015, both of which are hereby incorporated by reference in their entirety. Further examples of three dimensional articles that can be made with the apparatus and method herein include but are not limited to: containers, canisters, automotive parts, food and consumer good packaging, furniture components, building and construction materials, computer and smart device components, medical and healthcare devices and associated accessories and the like.

As used herein, a sheet of film can refer to any generally planar, flat sheet of polymeric material that is at least somewhat flexible to allow for its bending, flexing and/or reconfiguration from a planar configuration to a three dimensional configuration. The sheet of film 100, 109, can be constructed from a particular polymeric material in some embodiments. For example suitable materials from which the film can be constructed can include polymers, vinyl, nylon, polypropylene, polyethylene, polystyrene, multilayer hybrids such as veleron, silpaulin and different combinations, including fiberglass and/or layers of any of these materials. Some examples of film products can include house wraps, tarps, bird netting and a variety of meshes optionally including combinations of the above materials. Of course, other materials can be used to construct the sheets manipulated by the current apparatus and methods, including but not limited to composites, foils, rubbers and metals. Further, the sheet or the film in general can be in the form of an elongated web disposed on a roll. This web can be unrolled, so that individual sheets can be separated from the elongated web.

As shown in the embodiment of FIG. 2, the sheet of film 100, generally referred to herein as film, initially is provided in a flat two dimensional planar configuration. In this configuration, the film can include multiple outer edges 103. The film also can include corner voids 104 that separate respective edges 101 and 102. These respective edges 101 and 102 can be overlapped when the film transitions from the flat two dimensional planar configuration 100 to the three dimensional net shape of the film 109 illustrated to the right of FIG. 2. During the transition, the method can close at least a portion of the corner voids 104. With the respective edges overlapped, the apparatus optionally can bond them to one another, for example with heat as described further below. This bonding can assist in retaining the film 109 in its three dimensional net shape depending on the application.

With the film 109 in its three dimensional net shape, which can be a box or container type shape, the film can include one or more corners formed where the overlapped edges are bonded or otherwise secured to one another.

Optionally, the sheet of film 100 can be processed so as to fold the material of the film over on itself to create the corners. Where the material is folded over, it can subsequently be bonded with the bonding elements described below to form and secure the corners. In this case, the film might not be due cut to form edges that are overlapped.

Further optionally, the sheet 100 can be formed with one or more holes 103H. These holes, in some embodiments, can be die cut or punched through the sheet during a forming operation. The holes further optionally can operate as a filtering element to allow certain material in the finished three dimensional article to exit that article, while other materials remain trapped in the article. As an example, where the three dimensional article optionally is a cat litter filter, a user can lift the litter filter from a litter box. While the smaller litter material exits the holes, the animal waste can remain trapped in the filter for disposal.

The articulating vacuum plates system 10 and its components will now be described in further detail with reference to FIGS. 1 and 3-7. In this embodiment, the articulating vacuum plate system 10 can be used in a method to construct certain types of containers from sheets of planar, two dimensional films or webs of that film. The system or apparatus 10 can include a first forming portion 20. The first forming portion 20 can include primary movement mechanism 25. This primary movement mechanism can be in the form of a hydraulic ram, an electric motor, rack and pinion system, or any other type of mechanism or assembly adapted to move the vacuum plates and/or base plate in direction M toward the second forming portion 30. As illustrated, the movement mechanism 25 can be configured to move the vacuum plates from a first position (FIG. 4) distal from the contoured mold or hood 32 into a second position (FIG. 5) in which the vacuum plates are disposed at least partially within the contoured mold 32, optionally with the film 109 disposed between the respective components of the hood and the vacuum plates.

The first forming portion 20 can include multiple secondary movement mechanisms 23A, 23B, 23C, 23D, which can be attached to a stationary plate 26 at one end, and the respective vacuum plates 21A, 21B, 21C, 21D and an opposing end. The secondary movement mechanisms can be similar to the first movement mechanism can be configured to articulate the vacuum plates relative to the base plate 22 and/or one another. In some cases, the primary movement mechanism and the secondary movement mechanisms can be operable to simultaneously move the respective components of the apparatus in a concerted manner.

Turning now to the respective vacuum plates, as shown in FIG. 1, one of more of the vacuum plates includes multiple vacuum ports. Through these vacuum ports a vacuum is drawn so that an overlying sheet of film 100 is brought into close proximity to and generally contacts the respective support surface of the vacuum plate. Referring to FIG. 1, each of the vacuum plates 21A, 21B, 21C and 21D can be joined with and in fluid communication with a vacuum source VS via respective hoses and/or conduits. The vacuum source VS can be in the form of a vacuum that provides preselected vacuum (for example, it creates negative pressure) to each of the respective plates in the forming portion 20.

As a more particular example, reference is made to FIG. 1A. There, an exemplary plate 21A, which can be similar to the other vacuum plates or parts of the forming portion 20, can include a vacuum housing 21AK. The vacuum housing 21AK can include a multiple outer walls that cooperatively form and defined an internal vacuum chamber 21AC. The internal vacuum chamber 21AC can be confined substantially only to the single vacuum plate 21A, that is, this vacuum plate internal chamber 21AC might not be in direct fluid communication with the internal chambers of adjacent or other vacuum plates in the forming portion 20, other than each of those plates being commonly in fluid communication with the vacuum source VS via the conduits. Thus, each vacuum chamber of each respective vacuum plate is separate and independent from the vacuum chambers of other plates associated with the forming portion. Of course, in some applications, although not shown, the plates can be linked and fluid communication with one another so that the respective vacuum chambers are in fluid communication with one another and the vacuum source.

As shown in FIG. 1A, the vacuum plate housing 21AK can define vacuum ports 21AP that are in fluid communication with an upper surface 21AS, also referred to as a contact surface, or vacuum surface of the vacuum plate. The vacuum ports can enable the negative pressure and/or vacuum exerted by the vacuum source in the vacuum chamber 21AC to be transferred and communicated through the contact surface 21AS, and ultimately to a portion of the film 100,109. The vacuum drawn through the respective vacuum ports 21AP exert a negative pressure that sucks and/or pulls or otherwise urges the sheet 100, 109 so that it has contact with and/or engages at least a portion of the vacuum surface 21AS. In turn, the sheet, where it contacts the vacuum or contact surface 21AS, can move with the vacuum plate 21A when the vacuum plate 21A articulates, pivots or otherwise moves relative to other vacuum plates or other components of the first forming portion 20. Optionally, during this process of moving the film, no positive pressure (other than ambient pressure) is applied to the sheet or film.

With regard to movement of the vacuum plate 21A, FIG. 1A illustrates an optional component that is included with and/or joined with the vacuum plate so that the vacuum plate can articulate relative to another component of the forming portion 20, for example, the base plate 22. In particular, the vacuum plate 21A can be outfitted with a hinge or pivoting mechanism 21AP. This hinge can be coupled to the base plate 22. With this construction, the vacuum plate 21A can be configured to pivot via the hinge about pivot axis 21APA, thereby allowing the vacuum plate 21A to move relative to the base plate 22. The base plate 22 optionally can be outfitted with internal vacuum chamber and respective ports similar to the vacuum plate 21A. Likewise, the other vacuum plates 21B, 21C and 21D can be structured similar to the vacuum plate 21A, and can be movably mounted to the base plate 22.

As shown in FIG. 1, the base plate 22 can be centrally located relative to the other vacuum plates. In some cases, the base plate 22 optionally can be mounted in a stationary manner relative to the primary movement mechanism 25 and/or the plate 26. For example, when the movement mechanism 25 moves the ram 25R, the base plate 22 does not move relative to the ram 25R, but might move relative to the movement mechanism stand 25S, generally away from and/or toward that stand. As noted above, the various respective articulating plates 21A, 21B, 21C and 21D optionally all can move relative to that base plate 22 in a preselected manner during a forming operation. Again this movement can be achieved via movement and operation of the respective secondary movement mechanisms 23A, 23B, 23C and 23D associated with the respective vacuum plates.

The first forming portion 20 and the second forming portion 31 cooperate to convert a two dimensional planar sheet of film to a three dimensional net shape. As illustrated in FIG. 1, the orientation of the first forming portion 20 can be such that it is below the second forming portion 30. The first forming portion 20 and its components can move upward in a direction M so that the vacuum plates are eventually at least partially disposed within the walls of the second forming portion 30.

Optionally, depending on the application, the orientation of the first forming portion of the second forming portion can differ. For example, instead of the first forming portion including components the move vertically, those components can move horizontally or at some preselected angle, toward and/or into a corresponding second forming portion. Further optionally, although it is illustrated with the first forming portion 20 being the moving component of the apparatus 10, alternatively, the second forming portion 30 can be outfitted with a movement mechanism so that the hood moves relative to the vacuum plates, with the base plate remaining substantially stationary relative to the ground during this movement. The relative movement of the second forming portion 30 can be coordinated with movement and articulation of the respective vacuum plates 21A, 21B, 21C, and 21D, so as to transition the sheet from a two dimensional form to a three dimensional form, and so as not to damage the respective components of the different forming portions.

Optionally, in any of the embodiments herein, the second forming portion 30 can be outfitted with some type of articulating or movement mechanism. When so constructed, the second forming portion 30, and optionally the various walls 31A, 31B, 31C and 31B and/or base 35, can be configured to move relative to one another, relative to the base 35 and/or relative to the first forming portion. The walls and/or base can be used to selectively impart a three dimensional that shape in the film when the film is located between the first forming portion and the second forming portion.

Optionally, the various components of the apparatus 10, including the forming portions and the respective vacuum plates can be constructed from a durable material, such as metal, composites and/or high-strength polymers. These components can be machined, molded, or otherwise formed using particular techniques. Further optionally, the vacuum source used in conjunction with the apparatus to exert a negative pressure through the respective vacuum plates can be any type of negative pressure pump or vacuum pump.

Figure 6:
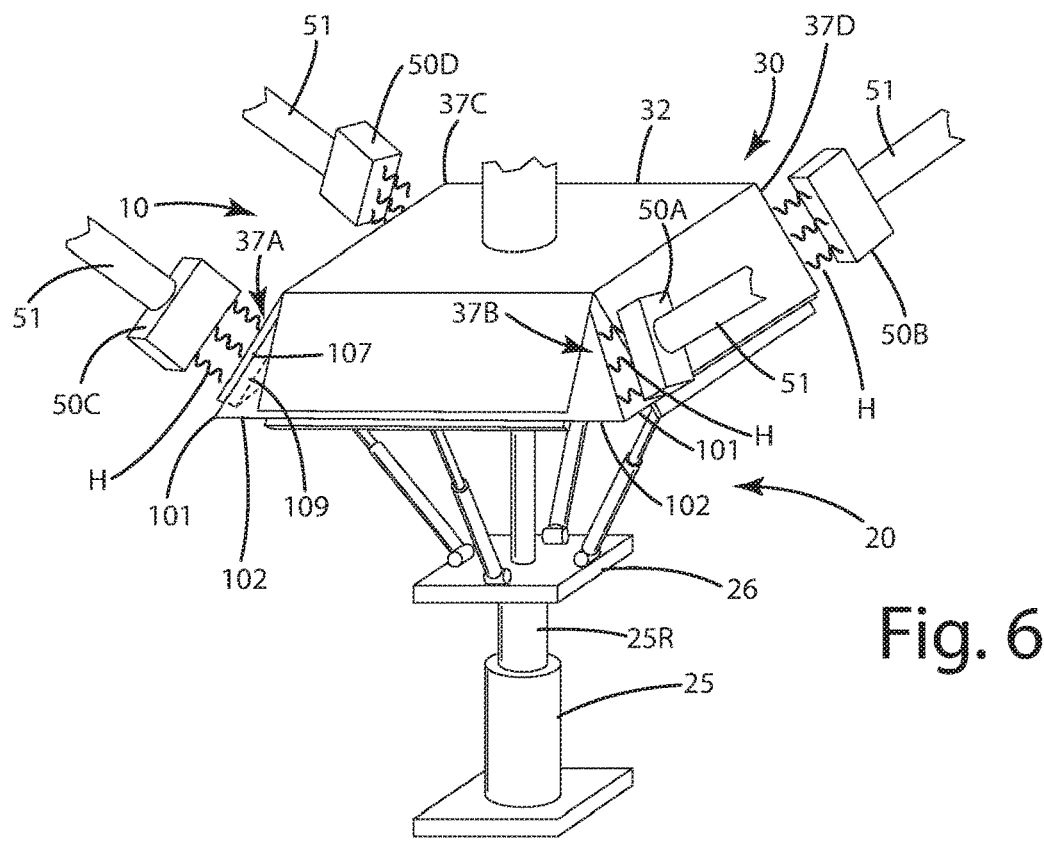
FIG. 6 is a perspective view of the articulating vacuum plate system with bonding elements bonding overlapping corners of the sheet of film to one another to further secure the film in the three dimensional net shape.

Referring to FIG. 6, the apparatus 10 optionally can include one or more bonding elements 50A, 50B, 50C and/or 50D. As illustrated, these bonding elements can be disposed around the hood 32 of the second forming portion 30 so that they are generally aligned with corner openings 30 7A, 30 7B, 30 7C and 3070 defined by the hood 32 and in particular between the walls of the hood. These bonding elements further optionally can be in the form of heating elements that exert sufficient heat on the sheet of film, and in particular the overlapping edges, so as to thermally bond those edges together 101 and 102 to form respective corners 107 in the film while the film is in a three dimensional form and located between the hood and the respective vacuum plates of the forming portions.

The bonding elements 50A, 50B, 50C and 50D can each include a heating element or plate, for example 50CP as shown in FIG. 6. Generally, the heating element exerts heat H upon certain preselected portions of the film while the film is in the three dimensional net shape. The heating element or plate can be inductively, electrically, or otherwise heated to temperatures exceeding the melting point of the sheet of film so that upon direct contact of the heating element with, or the application of heat on, one or more edges 101, 102 of the film 109, when in the three dimensional net shape, melts, fuses or otherwise changes so as to bond with the other edge overlapped with it, thereby forming the respective corner 107 of the film in the three dimensional form.

Optionally, although illustrated as separate heating elements or plates, which are themselves extended and/or retracted via mechanisms 51 toward and/or away from the film, the bonding elements can be built directly into the walls of the hood. In other cases, the elements can be built into and incorporated into the respective vacuum plates. Further optionally, the bonding elements can be in the form of sonic welders, radio frequency generators, ultrasound generators, spot welders, continuous welders, and the like, depending on the application in the material from which the film is constructed.

A method of utilizing the apparatus 10 of the current embodiment to form a three dimensional film 109 from a generally flat, two dimensional, planar sheet of film 100 will now be described in further detail. The process can begin with the provision of a sheet of film 100 as shown in FIG. 2. Optionally, the film 100 can be cut or otherwise shaped to include multiple edges 101 and 102, with respective corner voids 104 defined there between. Other features, such as handles and other openings, can be die cut or otherwise formed in the sheet 100 before it is loaded into the apparatus 10.

As shown in FIG. 3, the sheet of film 100 is loaded onto the first forming portion 20 of the apparatus 10. In particular, the lower surface 100LS of the film 100 is disposed in contact with the two dimensional surface 21DS formed by the respective vacuum plates 21A, 21B, 21C, 21D and 22. In this configuration, the vacuum plates of the apparatus are generally arranged in the first mode. The sheet is brought into contact with the surfaces, for example 21AS, of the respective vacuum plates. Upon loading, the vacuum plates of this embodiment can be generally configured so as to cooperatively form a generally planar two dimensional surface 2DS as mentioned above. When so configured, the respective first, second, third and fourth vacuum plates, along with the base plate, are disposed in a first mode. These plates can be supported in this mode by the respective secondary movement mechanisms and other components of the apparatus.

Optionally, although not shown, the surfaces of the respective vacuum plates and other support structures of the first forming portion 20 can be slightly contoured, for example, rounded or angled at their contact surfaces that contact the film 100. With these contours, the film may not be in a perfectly two dimensional form, for example, it may be slightly rounded or bent in one or more dimensions. Despite this, the film generally can be considered to be generally planar and in a two dimensional form in some applications.

With the film 100 sufficiently loaded and properly aligned on the two dimensional surface 2DS of the respective vacuum plates of the forming portion 20, or more generally loaded on a contact surface and/or vacuum surface of one or more of the plates, the vacuum source VS can be actuated.

Because the vacuum source VS is in fluid communication with the respective internal chambers of the different vacuum plates, for example the articulating vacuum plates 21A, 21B, 21C and 21D, as well as the base plate 22, a vacuum is exerted within the internal chambers of the respective vacuum plates. As a result, the vacuum ports associated with the vacuum chambers exert a pulling or sucking force through the respective contact surfaces or vacuum surfaces of the vacuum plates, thereby pulling the film 100, and in particular the lower surface 100LS, toward the contact surfaces of those vacuum plates. The vacuum thus functions to secure the film to the first forming portion 20 and hold it in engagement and/or contact with a significant portion of the various surfaces of the vacuum plates.

After loading is complete and vacuum is applied to the film, the second forming portion 20 can begin to transition to a second mode while the film is secured to the plates with the vacuum. In particular, as shown in FIG. 1, the first, second, third and fourth vacuum plates 21A, 21B, 21C and 21D can begin to be moved by the secondary movement mechanisms 23A, 23B, 23C and 23D respectively. These movement mechanisms effectively articulate the vacuum plates relative to one another and/or to the base plate. The plates 21A, 21B, 21C and 21D begin to move and articulate downward in directions D as illustrated. As described above, this articulation can occur by the respective plates, for example, plate 21A shown in FIG. 1A, pivoting about a pivot axis 21APA that is associated with a hinge or pivot mechanism 21AP.

Figure 4:
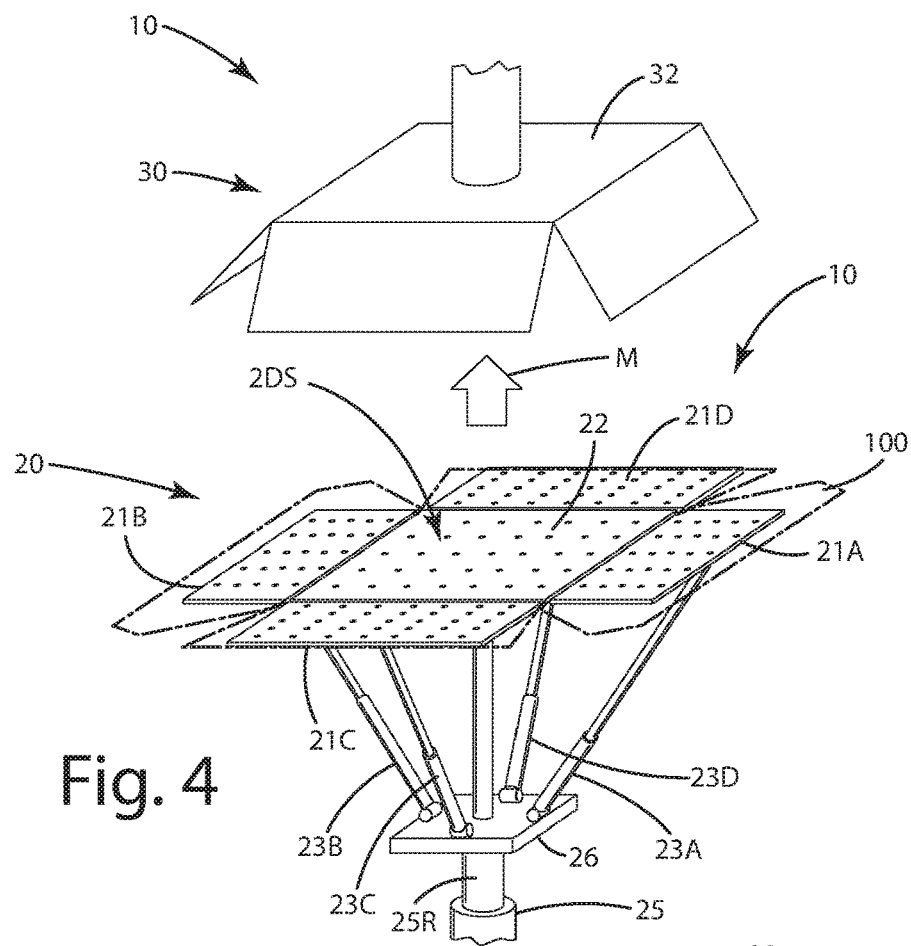
FIG. 4 is a perspective view of the articulating vacuum plate system after the film is loaded, and the plates begin to articulate from the first mode to the second mode, and move relative to a contoured mold.

As the respective vacuum plates, and the apparatus in general, transitions to a second mode, the previous two dimensional surface 2DS in FIGS. 3 and 4, transitions to a three dimensional surface 3DS in FIG. 1. Accordingly, the film 100 that was disposed on the two dimensional surface 2DS transitions from a generally planar, two dimensional form to a three dimensional form. This transition is facilitated and possible due to the vacuum being exerted through the respective articulating and other vacuum plates of the apparatus. Again, these plates can hold the sheet in engagement and/or contact with the surfaces of the plates via the vacuum applied through the vacuum ports to the film. As the film transitions from the two dimensional form to the three dimensional form, the respective edges 101, 102 of the film begin to move toward one another, effectively closing a reducing the sizes of the corner voids 104 as shown to the left in FIG. 2. In so doing, the film begins to attain a three dimensional form similar to that shown to the right of FIG. 2.

Optionally, while the film is being transitioned, via the vacuum plates of the first forming portion transitioning from the first mode to the second mode, the first forming portion 20 can be actuated so that the movement mechanism 25 moves the plates and the transitioning film in direction M toward the second forming portion 30. The first, second, third and fourth vacuum plates can articulate simultaneously relative to one another and/or the base, as these plates and the base plate and other components of the first forming portion are moved upward into at least a portion of the contoured mold 32. In some applications, the movement of the plates toward the second forming portion 30 can be a separate operation that does not occur simultaneous with the articulation of the plates relative to one another and/or the base plate.

The first forming portion 20 can continue to move upward until the vacuum plates of that portion at least partially enter into the contoured mold 32 of the second forming portion 30. As the plates and film enter the contoured mold 32, the contoured mold can assist in further transitioning the film to configure the film in a three dimensional net shape that corresponds to the contoured mold and/or the surfaces of the vacuum plates. When the first forming portion 20 is fully engage with the second forming portion 30, the film generally attains the three dimensional net shape. The film also is trapped between the inner surfaces of the contoured mold 32 and the upper surfaces, for example 21AS, of the respective vacuum plates.

As noted above, with film 109 in the three dimensional form or new shape, the respective edges of the film can be overlapped. As shown in FIG. 6, bonding elements 50A, 50B, 50C and 50D can be applied to corresponding overlapped edges 101 and 102 adjacent those bonding elements. When applied, the bonding elements can apply heat to the respective edges to bond those edges together and form respective corners 107 of the film 109. In turn, this bonding of the edges from the corner can further secure the film in the three dimensional net shape.

Optionally, during the forming process and the transition of the film from the two dimensional shape to the three dimensional net shape, no heat is applied directly to the base plate, vacuum plates and/or film, except via the corner bonding elements. Accordingly, the method herein typically does not employ any type of a conventional thermoforming or vacuum molding process. In addition, in the methods herein, while negative air pressure is applied through the vacuum ports of the plates, no positive air pressure, other than ambient air pressure, is applied through the forming apparatus or otherwise to the film to form the final, desired three dimensional shape. As used herein, ambient pressure is the air pressure at the location of the forming machine described herein.

Figure 7:
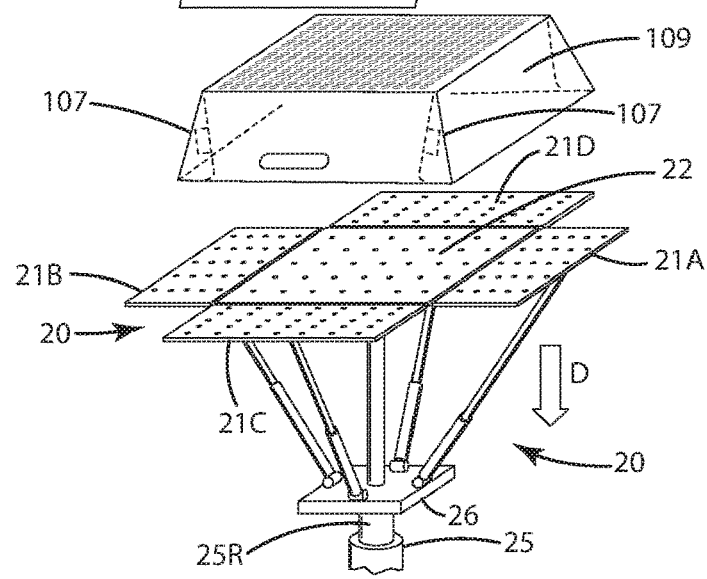
FIG. 7 is a perspective view of the articulating vacuum plate system opening, with the plates withdrawing from the contoured mold, and the film being ejected from the apparatus and retaining its three dimensional net shape, optionally in the form of a box.

With the film 109 formed in its three dimensional net shape and the respective corners bonded, the film can be in the form of its final desired shape, which as illustrated can be in the form of a litter sieve for an animal waste disposal system. With the film 109 formed, it can be removed from the apparatus 10. For example, as shown in FIG. 7, the movement mechanism 25 moves the respective vacuum plates 21A, 21B, 21C and 21D, as well as the base plate 33 downward in direction D. This withdraws those plates from the contoured mold 32 of the second forming portion 30. The vacuum can be stopped so that the vacuum plates no longer pull the film 109 toward them. Optionally, a puff of air can be blown through the vacuum ports to eject the film 109 from the plates. Alternatively, the contoured mold 32 can include an ejector mechanism that ejects the film 109 formed in a three dimensional net shape therefrom. The finished three dimensional article of the film 109 can then be collected and transported to another assembling, processing and/or packaging station.

Figure 8:
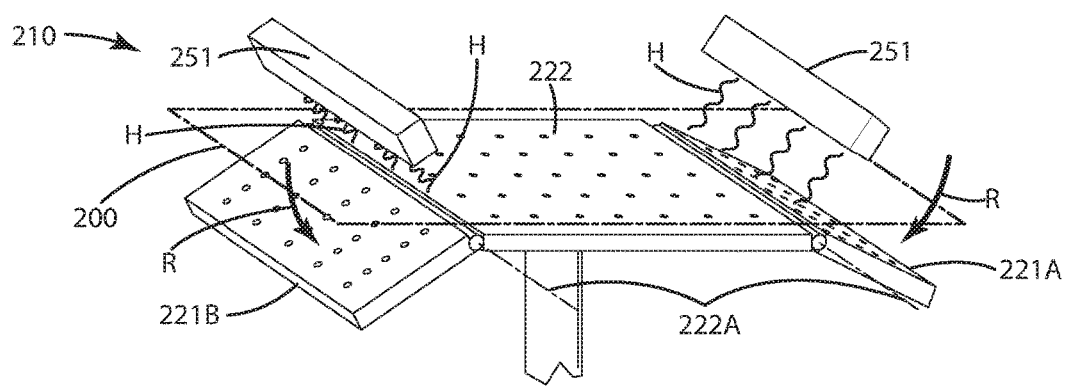
FIG. 8 is a perspective view of a first alternative embodiment of the articulating vacuum plate system.

A first alternative embodiment of the articulating vacuum plate system and related method is illustrated in FIG. 8 and generally designated 210. This embodiment is similar in structure, function and operation to the embodiment described above, with several exceptions. For example, this embodiment can include first 221A and second 221B articulating vacuum plates which are similar to the vacuum plates described above. These plates can be movably joined with a stationary base plate 222. The base plate can be configured so that it is generally immovable relative to the ground or some type of stand, frame, or support. The vacuum plates, however, can pivot, articulate or otherwise move relative to the base plate. As shown in FIG. 8, the respective vacuum plates can articulate and/or move downward in direction R, optionally rotating while so moving about respective pivot axes 222A. The apparatus 10 optionally can include one or more bonding elements 251 which can exert heat H over certain portions of the vacuum plates and/or film 200, shown in broken lines, when the film is loaded on the apparatus.

Figure 9:
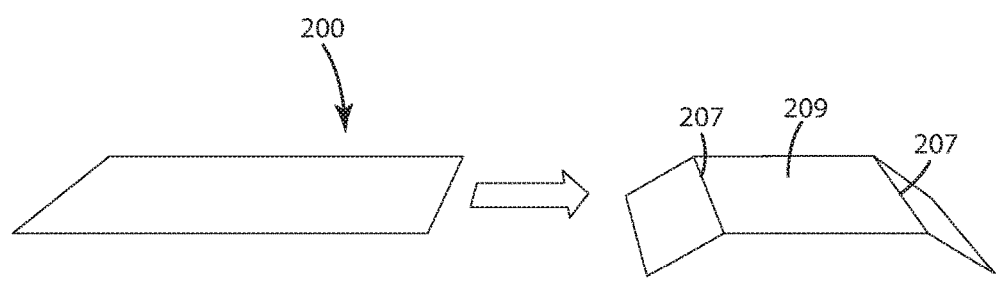
FIG. 9 is a perspective view of a two dimensional, planar sheet of film that is transformed by the apparatus and method of the first alternative embodiment into a three dimensional net shape in the form of an angled part or other configuration.

The apparatus 210 can operate similarly to the apparatus 10 described above. For example, the plates 221A and 221B can articulate relative to the base plate 222 while drawing a vacuum on a loaded sheet of film 200. This in turn transitions the film 200 from a flat, planar two dimensional configuration shown to the left in FIG. 9 to a three dimensional form of the film 209 as shown to the right of FIG. 9. The film 209 can include rounded or angled corners 207 so that the film is of a three dimensional form. The corners can be heat treated or otherwise modified with the bonding elements 251 so as to impart a semi-permanent or permanent bend, rounding and/or angle in the film 209, thereby further securing the film in the three dimensional form.

Figure 10:
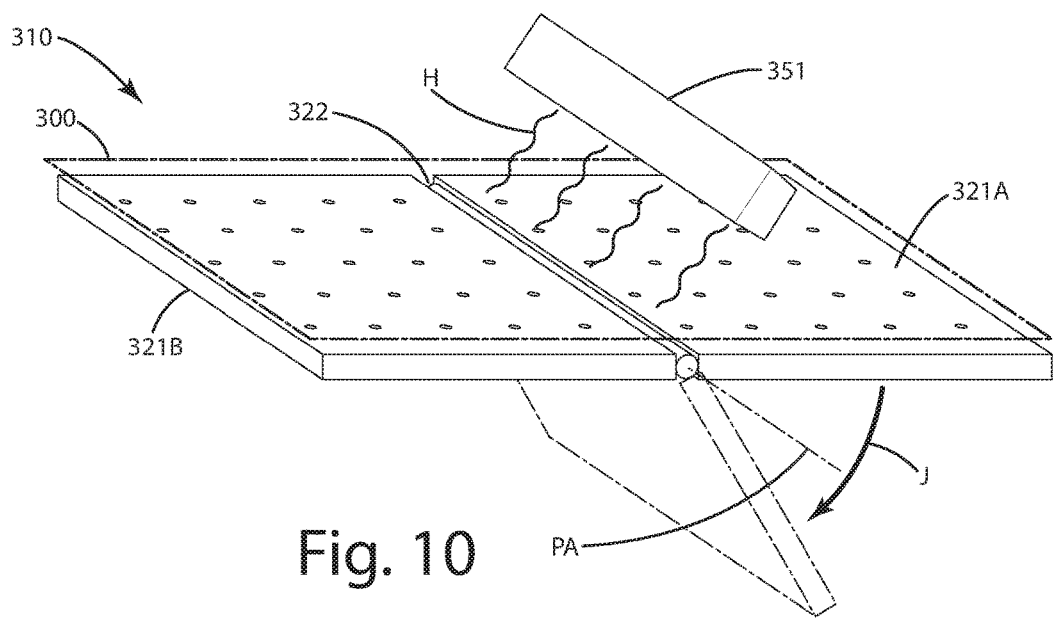
FIG. 10 is a perspective view of a second alternative embodiment of the articulating vacuum plate system.

A second alternative embodiment of the articulating vacuum plate system and related method is illustrated in FIG. 10 and generally designated 310. This embodiment is similar in structure, function and operation to the embodiments described above, with several exceptions. For example, this embodiment can include first and second vacuum plates 321A and 321B which can be pivotally joined with one another at a hinge 322. This hinge can enable the respective vacuum plates 321A and 321B to articulate relative to one another and optionally pivot about a pivot axis PA relative to one another and/or other components of the apparatus 310. The apparatus optionally can include a bonding element 351 similar to that of the embodiments described above to exert heat on film 300.

Figure 11:
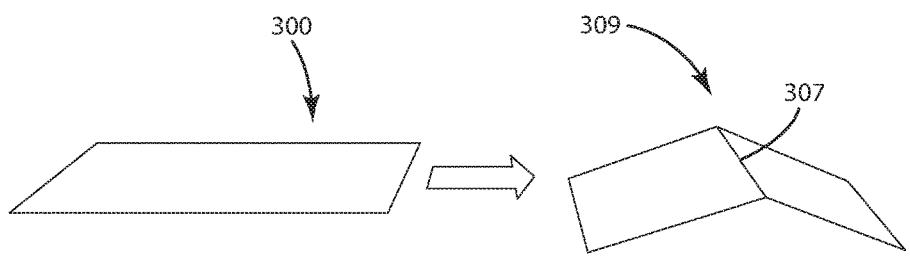
FIG. 11 is a is a perspective view of a two dimensional, planar sheet of film that is transformed by the apparatus and method of the second alternative embodiment into a three dimensional net shape in the form of an angled part or other configuration.

As with the other embodiments above, the vacuum plates can exert a vacuum or negative air pressure on the loaded two dimensional, flat planar film 300. The plates can articulate in direction J relative to one another, thereby transitioning from a first mode to a second mode. In so doing, the substantially planar two dimensional sheet of film 300, as shown to the left of FIG. 11, transitions to a three dimensional form as shown to the right of FIG. 11. The film can include a bent, rounded or otherwise angled portion 307 so that the film 309 is three dimensional. Optionally, the feature 307 can be heat set by the bonding element 351 to assist in maintaining the film in the three dimensional form.

A third alternative embodiment of the articulating vacuum plate system and related method is illustrated in FIGS. 12-15 and generally designated 410. This embodiment is similar in structure, function and operation to the embodiment described above, with several exceptions. For example, the apparatus of this embodiment can include a first forming portion 420 having first 421A and second 421B articulating three dimensional contoured vacuum plates. In this embodiment, these plates can have vacuum surfaces 421AS that are contoured, that is, they are three dimensional in one or more regions along the plates. The three dimensional contours of these plates can include undulations, ridges, angled portions, rounded portions, depressions, recesses, projections, and other surface features that impart a through three dimensional, rather than a planar, two dimensional configuration, to certain regions of the vacuum surfaces or contact surfaces 421AS, which are the surfaces of those plates that can contact the film 400.

The vacuum plates can be movably joined with a stationary base plate 222. The base plate can be configured so that it is generally immovable relative to the ground or some type of stand or support. While the base plate is shown as having generally planar, flat two dimensional vacuum surfaces or contact surfaces 422AS, in some applications, these surfaces 422AS can be configured to include a three dimensional contours.

Figure 14:
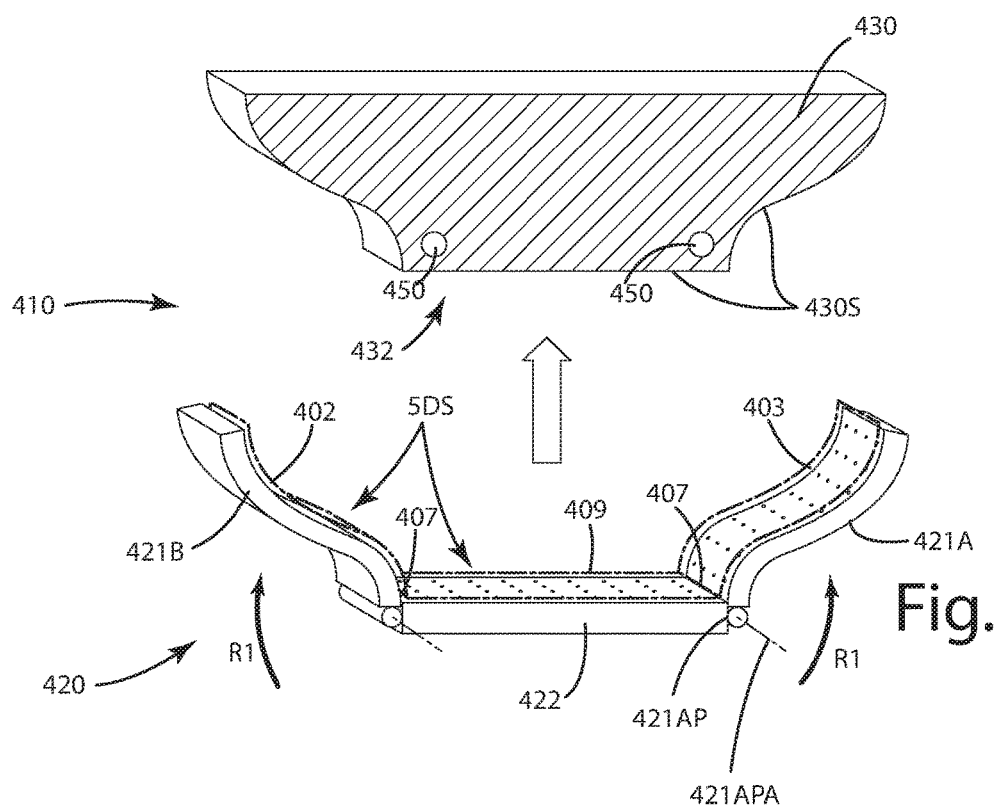
FIG. 14 is a perspective view of the third alternative embodiment of the articulating vacuum plate system with the sheet of film being further manipulated into another three dimensional configuration with the contoured three dimensional vacuum plates.

Like the embodiments above, the vacuum plates 421A, 421B can pivot, articulate or otherwise move relative to the base plate 422. As shown in FIG. 14, the respective vacuum plates can articulate and/or move downward in direction R1. The apparatus 410 optionally can include one or more bonding elements 450 which can exert heat H over certain portions of the second forming portion 430 and/or the film 400, 409. The second portion can be in the form of a mold having a three dimensional net shape on its outer contact surfaces 430S, which can generally contact the film and assist in finally conforming it to the three dimensional net shape. Optionally, the bonding elements 450 can be included directly in the second forming portion 430, exerting heat H through the contact surfaces of that component.

The apparatus 410 can operate similarly to the apparatus 10 described above. For example, the plates 421A and 421B can articulate relative to the base plate 422 while drawing a vacuum on a loaded sheet of film 400. This in turn transitions the film 400 from a first three dimensional configuration in a first mode shown in FIG. 13 to a second three dimensional form of the film 409 as shown in FIG. 14. The film 409 can include rounded or angled corners 407 so that the film is of a three dimensional form. The corners can be heat treated or otherwise modified with the bonding elements 450 so as to impart a semi-permanent or permanent bend, rounding, and/or angle in the film 409.

Figure 12:
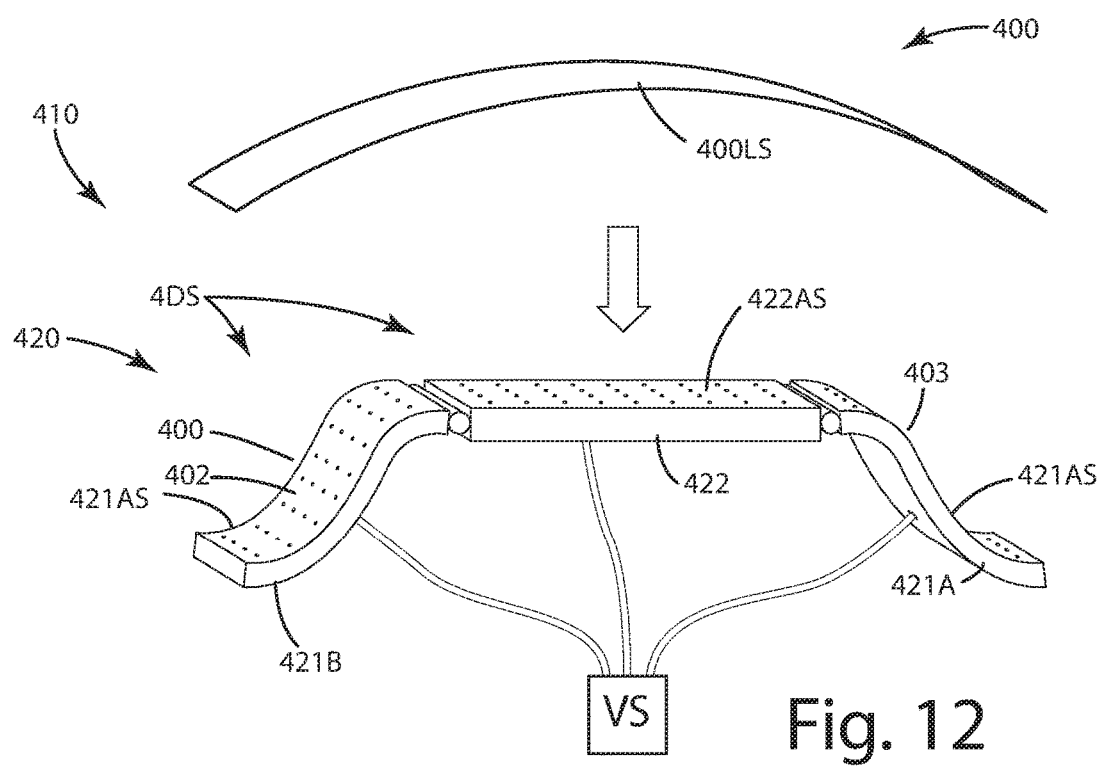
FIG. 12 is a perspective view of a third alternative embodiment of the articulating vacuum plate system utilizing contoured, three dimensional vacuum plates.

More particularly, as shown in FIG. 12, a sheet of film 400 is loaded onto the first forming portion 420 of the apparatus 410. The sheet of film 400 itself can be of a two dimensional flat planar configuration, or it can be slightly contoured in a three dimensional form if desired. The lower surface 400LS of the film 100 can come into contact with the base plate and articulating plates, and in particular the vacuum or contact surfaces 422AS and 421AS thereof. In this configuration, the vacuum plates 421A, 421B and 422 of the apparatus are generally arranged in a first mode.

As shown in FIG. 12, upon initial loading of the film, the vacuum plates of this embodiment can be generally configured so as to cooperatively form a first three dimensional surface 4DS via the three dimensional contoured surfaces 421AS of the articulating plates 421A and 421B, as well as the optional two dimensional surface 422AS of the base plate 422. When so configured, the articulating vacuum plates, along with the base plate, are disposed in a first mode. These plates can be supported in this mode by the respective secondary movement mechanisms and other components of the apparatus as described in other embodiments herein.

Figure 13:
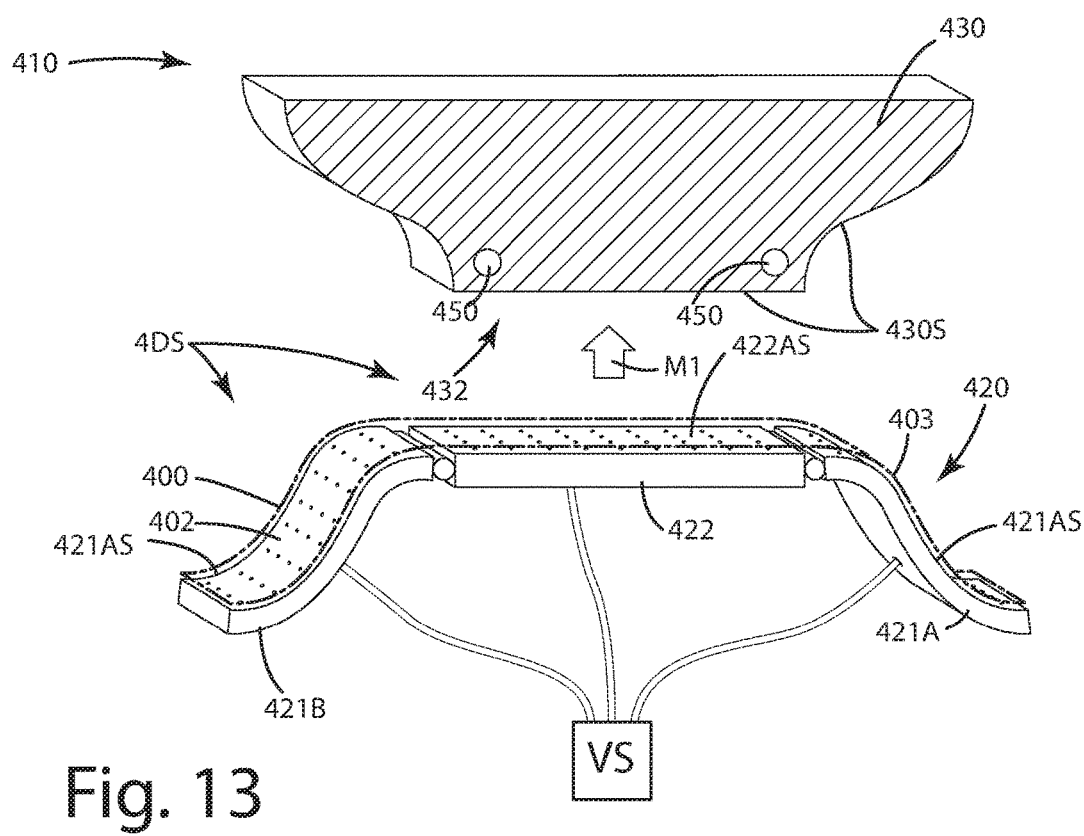
FIG. 13 is a perspective view of a sheet of film that is transformed by the three dimensional vacuum plates into a first three dimensional configuration in a first mode in the third alternative embodiment.

Referring to FIG. 13, with the film 400 sufficiently loaded and properly aligned on the three dimensional surface 4DS of the respective vacuum plates of the forming portion 420, or more generally loaded on a contact surface and/or vacuum surface of one or more of the plates, a vacuum source VS can be actuated. Because the vacuum source VS is in fluid communication with the vacuum plates, a vacuum is exerted within the internal chambers of the respective vacuum plates. As a result, the vacuum ports associated with the vacuum chambers exert a pulling or sucking force through the respective contact surfaces or vacuum surfaces of the vacuum plates, thereby pulling the film 400, and in particular the lower surface 400LS, toward the contact surfaces of those vacuum plates. The vacuum thus functions to secure the film to the first forming portion 420 and hold it in engagement and/or contact with a significant portion of the various surfaces of the vacuum plates.

After loading is complete and vacuum is applied to the film, the film 400 attains a first three dimensional form as shown in FIG. 13, generally conforming to the surfaces 421AS and 422AS of the respective vacuum plates. In this first three dimensional form, the film 400 is also in a first mode in which it optionally conforms to many of the three dimensional contours of the vacuum surfaces of the respective vacuum plates.

Like the other embodiments herein, the second forming portion 420 can transition to a second mode, while the film is secured to the respective vacuum or contact surfaces of the plates with the vacuum. In particular, as shown in FIG. 14, the first and second articulating vacuum plates 421A, 421B, can begin to be moved by a secondary movement mechanism (not shown) such as those mentioned above. These vacuum plates thereby move relative to one another and/or to the base plate. The plates 421A, 421B can to move and articulate downward in directions R1 as illustrated. As described above, this articulation can occur by the respective plates, for example, plate 421A, pivoting about a pivot axis 421APA that is associated with a hinge or pivot mechanism 421AP.

As the respective vacuum plates, and the apparatus in general, transitions to a second mode, the previous first three dimensional surface 4DS in FIGS. 12 and 13, transitions to a second three dimensional surface 5DS as shown in FIG. 14. Accordingly, the film 400 that was disposed on the first three dimensional surface 4DS in FIG. 13 transitions from a first three dimensional form to a second three dimensional form. This transition is facilitated and possible due to the vacuum being exerted through the respective articulating and other vacuum plates of the apparatus. Again, these plates can hold the sheet in engagement and/or contact with the vacuum or contact surfaces of the plates via the vacuum applied through the vacuum ports to the film. As the film transitions from the first three dimensional form in the first mode to the second three dimensional form in the second mode, the respective portions of the film 402, 403 begin to move toward one another, effectively altering the overall three dimensional configuration of the film. In so doing, the film begins to attain a second three dimensional form, different from the first three dimensional form.

The first forming portion 420 can move upward until the vacuum plates of that portion are located adjacent the outer surface 430S of the second forming portion 430. As the plates and film engage the contoured mold 432, the contoured mold can assist in further transitioning the film to configure the film in a three dimensional net shape that corresponds to the contoured mold and/or the surfaces of the vacuum plates. When the first forming portion 420 is fully engaged with the second forming portion 430, the film generally attains the three dimensional net shape. The film also is trapped between the outer surfaces of the contoured mold and the contact surfaces of the respective vacuum plates. Such trapping can sandwich and compress the film therebetween.

Figure 15:
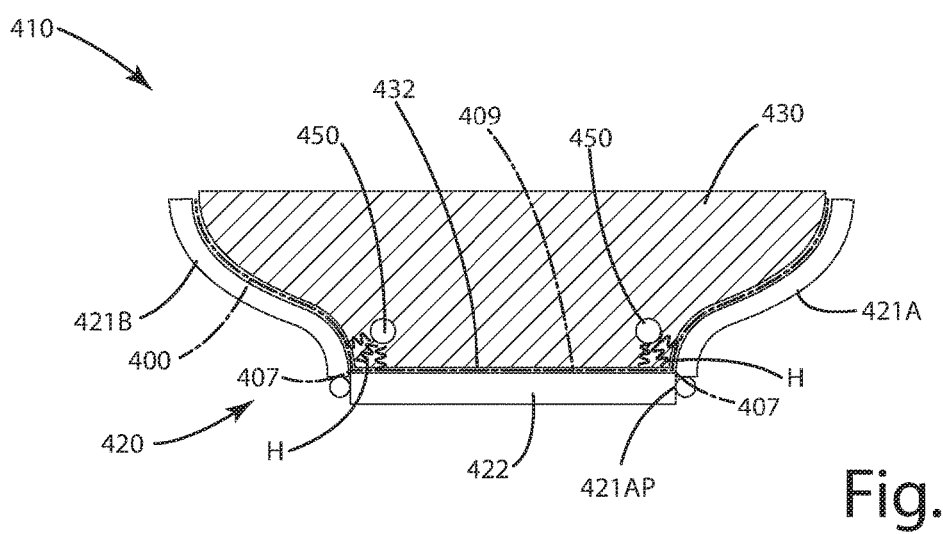
FIG. 15 is a perspective view of a sheet of film that is transformed by the three dimensional vacuum plates into a three dimensional net shape in a second mode in the third alternative embodiment.

Optionally, with film 409 in the second three dimensional form or new shape, as shown in FIG. 15, the bonding elements 450 can apply heat H to corresponding portions of the film adjacent those bonding elements. This can further secure the film in the three dimensional net shape. After the film is formed in the desired shape, the film can be ejected from the apparatus and further processed or packaged depending on the application.

A fourth alternative embodiment of the articulating vacuum plate system and related method is illustrated in FIGS. 16-25 and generally designated 110. This system and method are similar to the embodiments described above in structure, function and operation with several exceptions. For example, this system 110 includes a first forming portion 120 and a second forming portion 130. The first forming portion can move generally horizontally relative to the second forming portion 130 when forming a sheet of film 200, 209 into a desired three dimensional configuration from an initial flat, two dimensional configuration. The first and second forming portions also can be joined with a frame 150 upon which both move vertically while performing several operations as described below.

Figure 19:
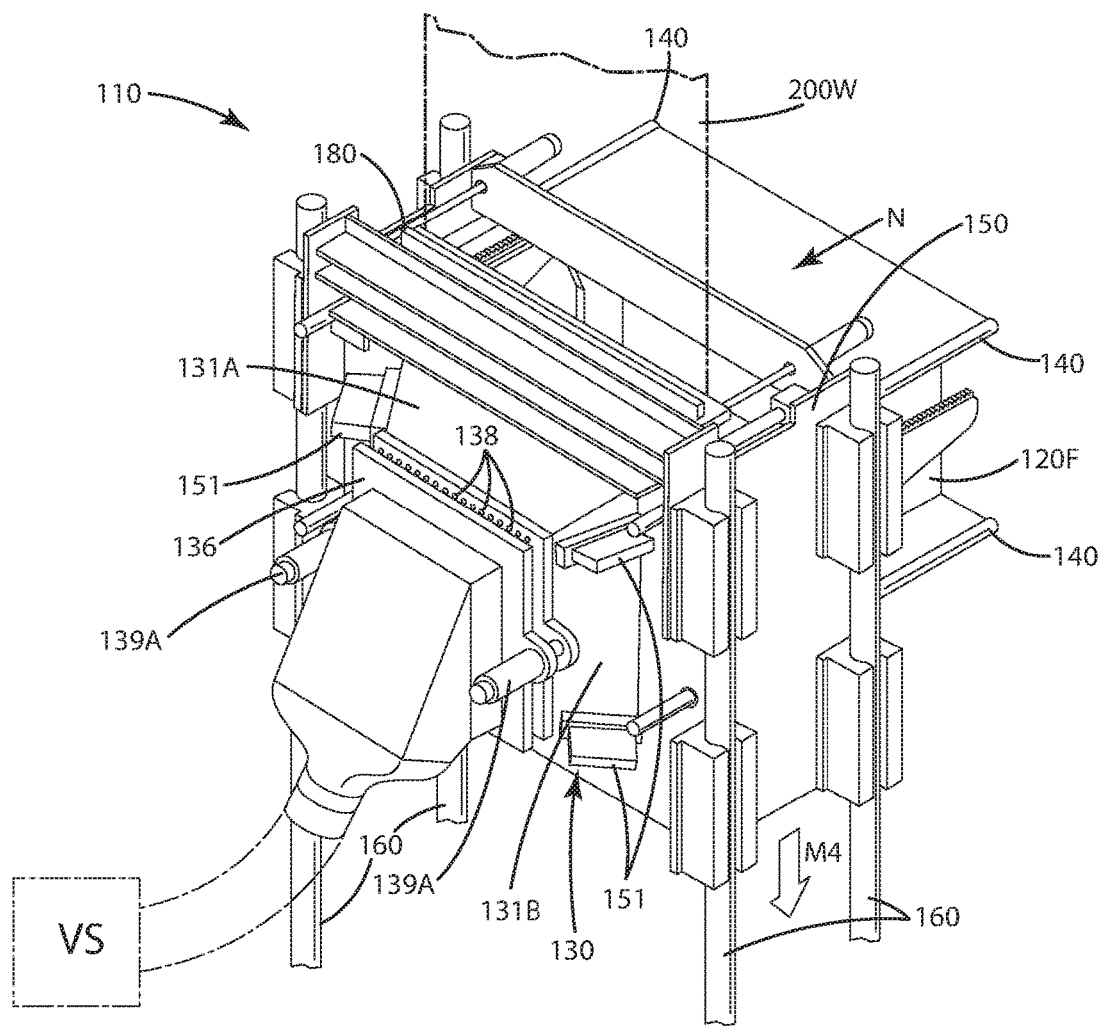
FIG. 19 is a perspective view of the articulating vacuum plate system of the fourth alternative embodiment.
Figure 20:
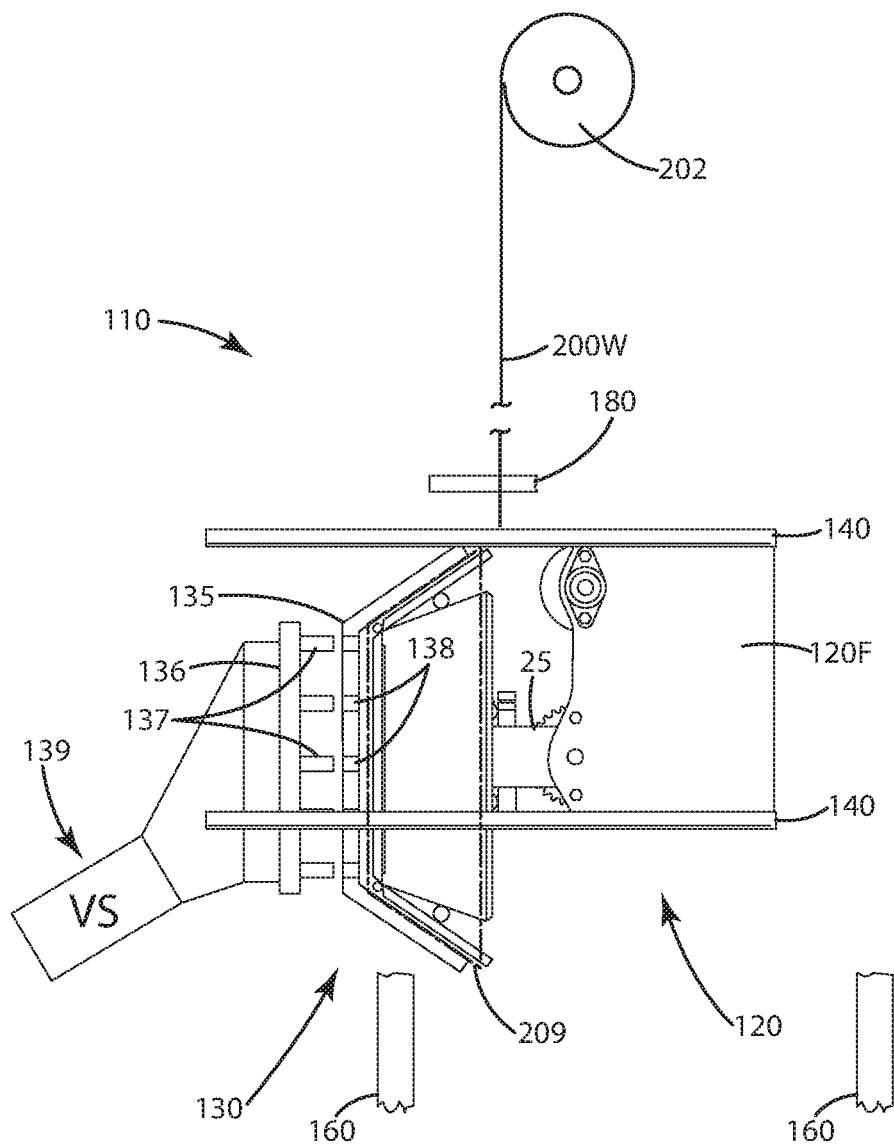
FIG. 20 is a side view of the first forming portion and second forming portion cooperatively forming a sheet into a three dimensional configuration with the fourth alternative embodiment.

The first forming portion 120, as shown in FIG. 19, can be mounted on one or more slide rods or bars 140 that are themselves mounted slidably and movably relative to a main frame 150 as shown in FIG. 20. The first forming portion 120 can include a first forming portion frame 120F that is mounted fixedly to the slide bars 140. As described further below, the frame 150, and any attached first and/or second forming portions, can be vertically movable along vertical slide rods or bars 160 as the machine performs various steps in the process of transforming the film from a two dimensional, flat sheet configuration to a three dimensional article. Generally, the first forming portion 120, its frame 120F and vacuum plates can be moved vertically with the frame 150 as described further below.

Figure 16:
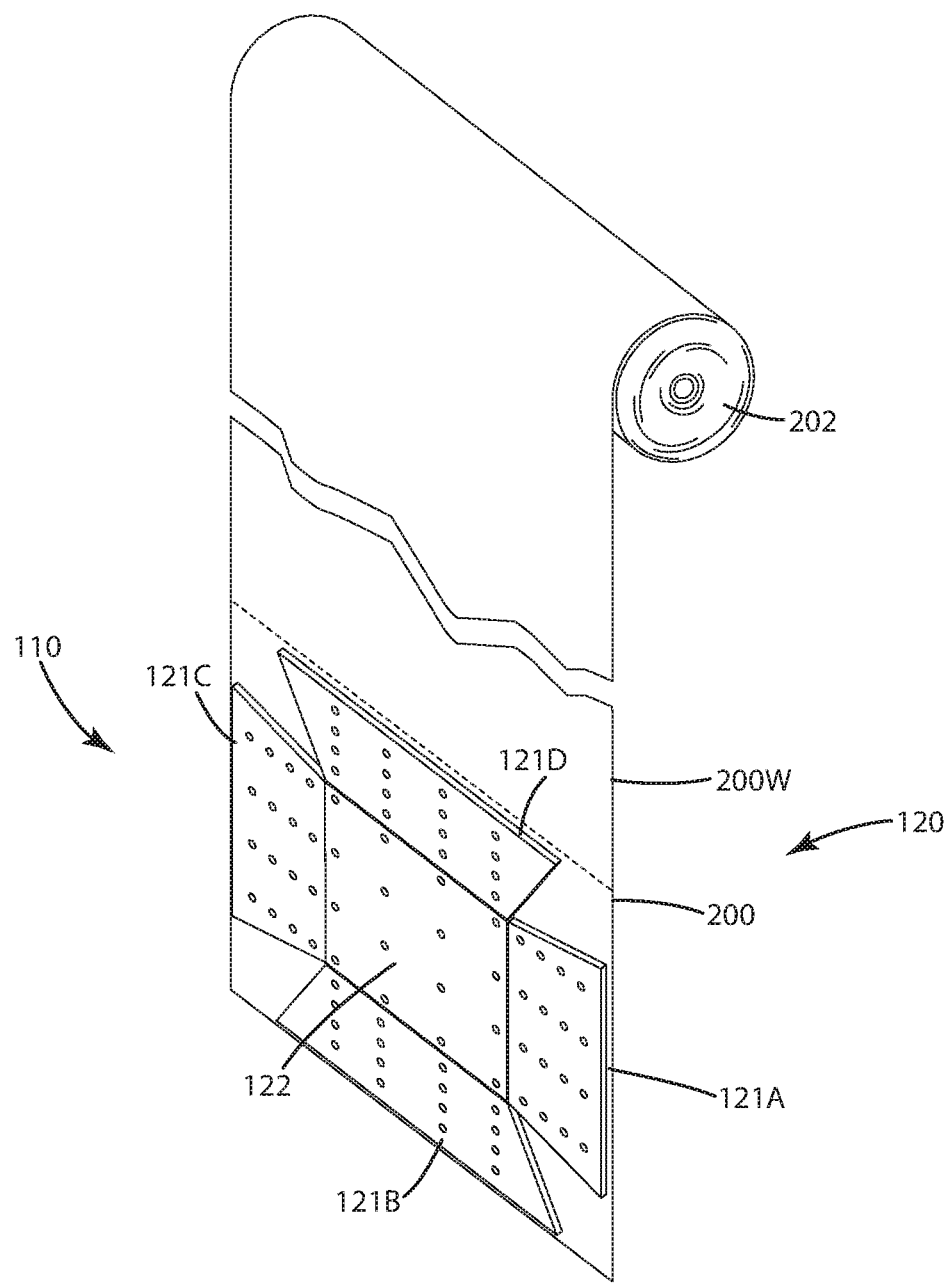
FIG. 16 is a perspective view of a sheet of film being placed in proximity to a first forming portion of a fourth alternative embodiment of the articulating vacuum plate system.

The first forming portion as shown in FIG. 16 can include one or more articulating vacuum plates 121A, 121B, 121C and 121D, which like the embodiments above can be movably joined with an optional base plate 122. Like the embodiments above, each of the vacuum plates can be independently movable via secondary movement mechanisms 123, for example, hydraulic or pneumatic rams, which can articulate and move the respective vacuum plates relative to one another, the base plate and/or other components of forming portion 120.

In this embodiment, the film 200 can be similar to the sheet of film 100 described above. The sheet 200 however can be without filter holes (e.g., holes 103H in FIG. 2) before forming, and can be generally in the form of an elongated web 200W that is spooled or wound on a roll 202. Although shown above the forming portion 120, this roll 202 can be placed anywhere on the machine, and can be rerouted using a variety of different rollers, depending on the application. Optionally, the web 200W of the film can be scored and/or precut to mimic the configuration of the sheet shown, for example, in the top of FIG. 2, or the web 200W can be unmodified, and simply a continuous web without any holes, corner cut outs or the like.

Figure 17:
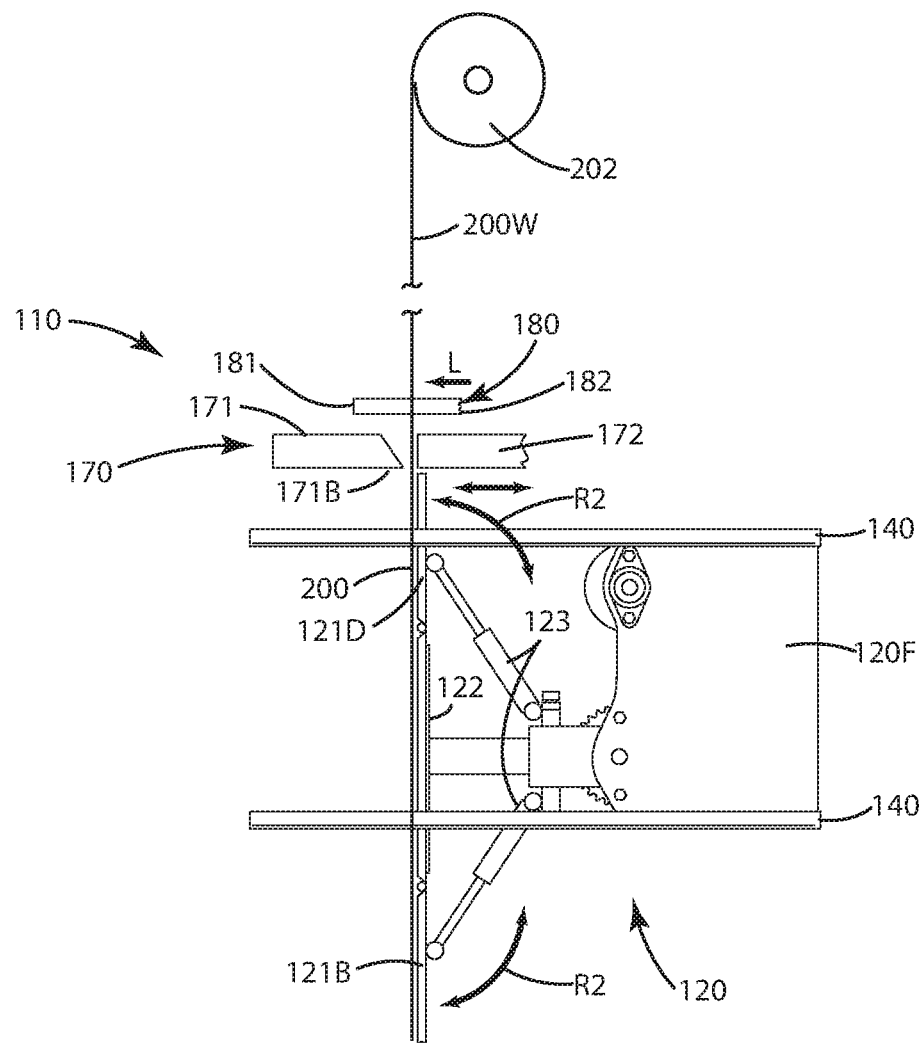
FIG. 17 is a side view of the sheet of film being placed in proximity to the first forming portion of the fourth alternative embodiment.

The system 110 can be configured to advance and cut the web 200W at preselected intervals so that the web is separated into individual sheets, each suitable for the manufacture of a single three dimensional article. For example, the system 110 can be outfitted with a cutting mechanism 170 and a web holder 180. As shown in FIG. 17, the cutting mechanism can include a cutter 171 with a blade 171B, and a corresponding landing 172. The blade 171B can be moved in the direction K toward and/or away from the landing 172 to effectively cut the individual sheets for forming with the first and second forming portions from the remainder of the web 200W. Of course, this bladed cutting mechanism can be replaced with any device capable of cutting the web, for example, a laser cutter and the like.

As also shown in FIG. 17, the system 110 can include a web holder 180 that clamps against and/or otherwise holds the web 200 in a fixed position relative to the frame 150, optionally as the cutting mechanism 170 cuts the web 200W to form an individual sheet 200 for further processing. This can ensure that the web of film is readied for formation of the next article with another portion of that film. The web holder 180 also can assist in the advancement of the web 200W so that multiple sheets can be cut sequentially and consistently from the web as described further below.

Figure 21:
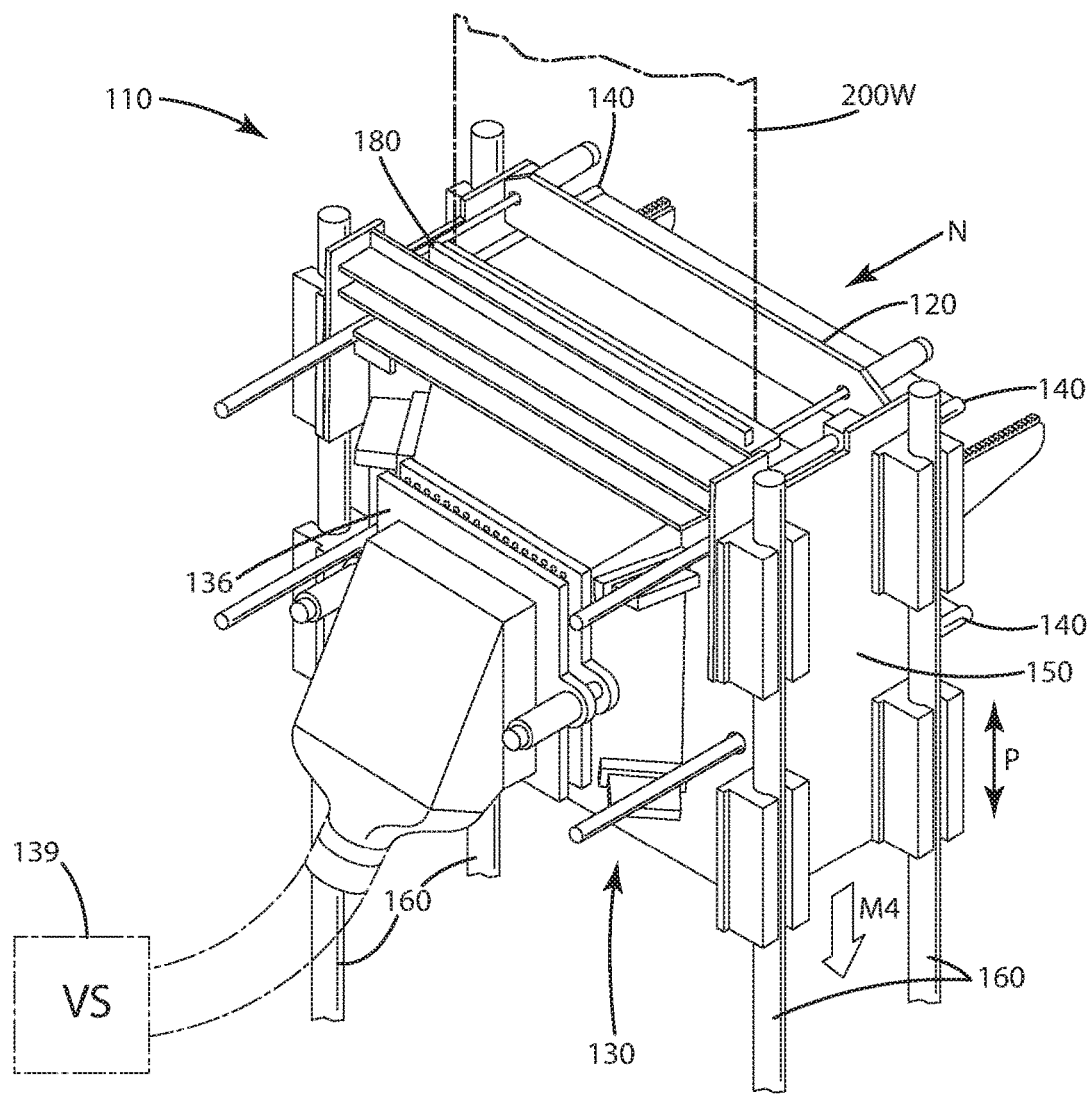
FIG. 21 is a perspective view of the first forming portion and second forming portion cooperatively forming a sheet into a three dimensional configuration with the fourth alternative embodiment.

The second forming portion 130, shown in FIGS. 20-21 can be similar to that of the second forming portion 30 in the embodiment described above, and can include a similar hood or contoured mold 132 having a base 135 to which multiple walls 131A, 131B, 131C and 131D are joined. These walls can be disposed in a fixed orientation relative to the base 135 and one another, but of course in other embodiments they can be pivotably attached to the base and/or one another so they can move and can be reconfigured in multiple orientations. The contoured mold 132 and its respective walls and base can form a three dimensional net shape to which the article formed from the sheet can be formed. Optionally, the second forming portion 130 also can include bonding elements 151, which are similar to the bonding elements for corners of the article described in the embodiment above and therefore will not be described again here.

The second forming portion 130 also optionally can be constructed so that the system can form holes in one or more parts of the article when the article is between the mold 132 and the vacuum plates/base plates. These holes can be similar to the holes 103H formed in the article in FIG. 2. Of course, depending on the desired configuration of the holes, the system can be modified to provide ones of any geometric shape, for example, elliptical, polygonal, half moon, simple slits, and the like. To make these holes, the second forming portion 130 can include a base plate 135 that can be part of the contoured mold 132. This base plate can be structured to define multiple openings 138. These openings can extend from an exterior of the contoured mold to an interior of the contoured mold. The second forming portion 130 can include a connector plate 136 that is outfitted with multiple die cut tubes 137. These die cut tubes can be hollow, and can include sharpened ends 137E. The die cut tubes can be in fluid communication with a vacuum source 139 so that air can be drawn under negative pressure through the die cut tubes 137 to remove die cut parts of the sheet 200 from the sheet and/or the contoured mold. These die cut tubes 137 are aligned with respective ones of the multiple openings 138 so that the tubes can fit into and/or through the multiple openings to engage and cut the sheet 200, optionally when the sheet is in the form of the three dimensional article 209. When the sheet is cut to form holes, small parts of the sheet are produced. These small parts, generally in the shape of the hole cut in the sheet, can be drawn under negative air pressure out of the contoured mold via the vacuum source 139 and thereby removed from the sheet and/or three dimensional article. The connector plate 136 can be movable toward and away from the base plate 135 via actuators 139A of the second forming portion. These actuators can be in the form of pneumatic or hydraulic rams, gears or cams capable of moving the die cut tubes into and out from the respective openings as described further below.

Operation of the system 110 will now be described with reference to FIGS. 16-25. To begin, as shown in FIGS. 16-17, a web 200W of film is advanced from roll 202 to a location generally adjacent the first forming portion 120. The web 200W can be grasped or clamped with a web holder 180 having a first part 181 and a second part 182 that move relative to one another. In particular, these parts can move toward one another and clamp the web 200W therebetween. These parts can be operated via gears, hydraulic or pneumatic rams, cams or other movement mechanisms. Generally the parts capable of moving toward and away from one another. When they move toward one another, they effectively clamp and trap a portion of the web 200W therebetween. As described further below, this clamping of the web can assist in advancing the web for subsequent formation of multiple sheets and respective articles. The system, as mentioned above includes a cutting mechanism. The cutting mechanism can cut the web 200W, optionally adjacent the web holder 180 and/or the first forming portion 120. The cutting mechanism 170 can include a first part 171, which as mentioned above can move a blade 171B toward a landing 172. Upon contact with the web 200W, an end of the web is separated from the remainder of the web to form a separated sheet 200. The sheet 200 can be completely disassociated and cut from the web 200W.

Figure 18:
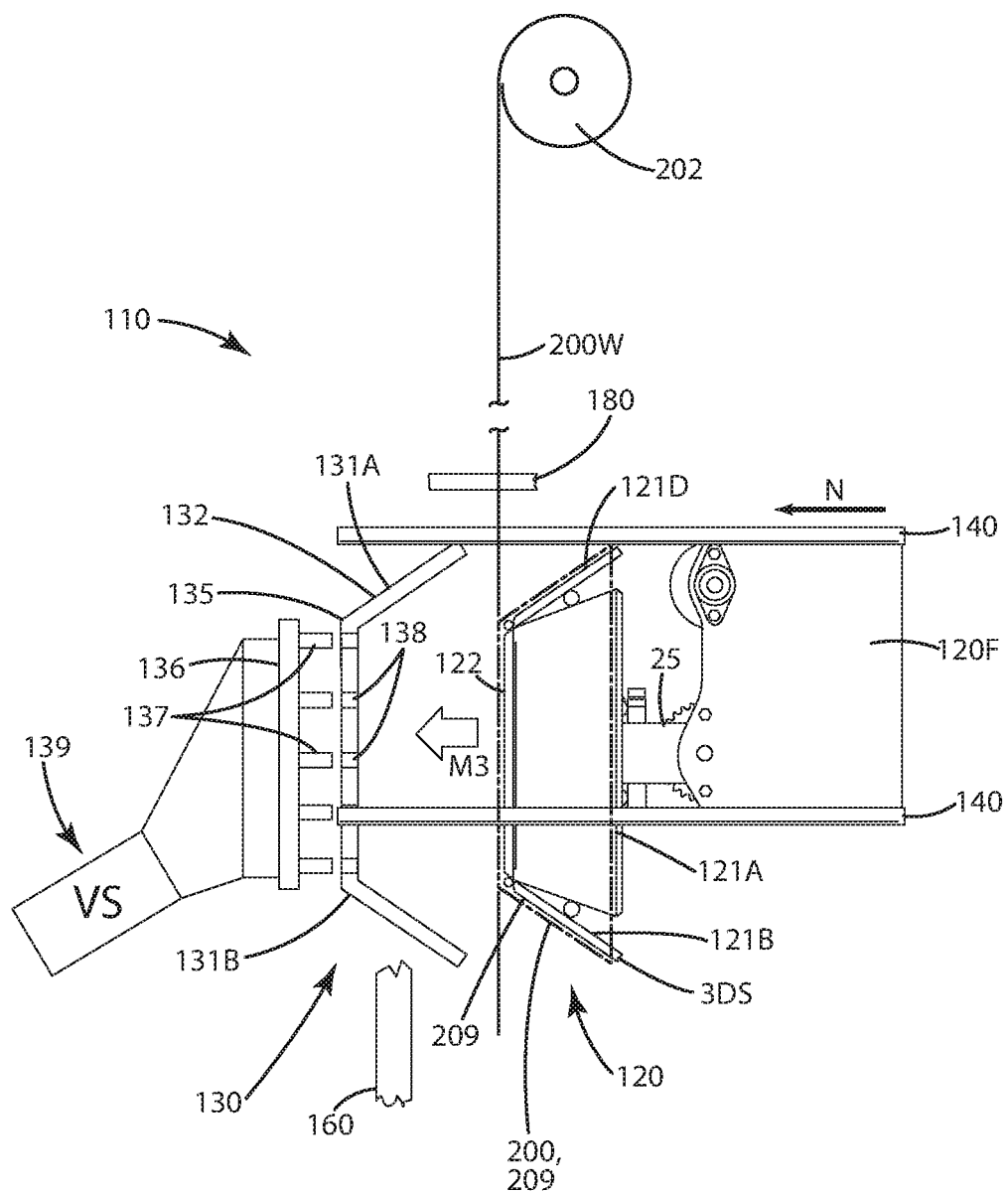
FIG. 18 is a side view of the first forming portion of the fourth alternative embodiment reconfigured to a three dimensional configuration in moving sheet of film toward a second forming portion.

The system 110, as shown in FIG. 17, can be precisely configured so that when the cutting mechanism 170 cuts the web to form a sheet 200, that sheet 200 is immediately adjacent the respective surfaces of the first forming portion 120. Generally, the sheet 200 can overlay the various surfaces of the base plate 122, the side walls 121A-121D, each having their own vacuum ports as described in the embodiment above and thereby forming a vacuum surface. The respective components of the first forming portion 120 also can be in a flat, two dimensional planar configuration as illustrated. The first forming portion 120 can be actuated so that sheet of film 200 is drawn under the force of negative pressure, that is, a vacuum, against the sidewalls and the baseplate, which are themselves in a two dimensional flat configuration as shown in FIG. 17, and cooperatively forming a contact surface or vacuum surface. In this configuration, the plates are considered to be in a first mode, much like the first mode of the embodiment above. The vacuum plates are reconfigurable and a second mode, as shown in FIG. 18 described below, in which the vacuum plates are moved in direction R2 (FIG. 17) to form a generally three dimensional surface 3DS while the vacuum plates supply vacuum therethrough to the film, assisting in conforming the film 200 to a three dimensional configuration 209 shown in FIG. 18. Generally, the first forming portion 120 with the respective vacuum plates 121A-121D, and baseplate 122 are formable in a three dimensional configuration to produce the three dimensional surface 3DS.

Optionally, although not shown, the system 110 can be configured to preprocess the web 200W between the roll 202 and the web holder 180. For example, the system can include a series of rollers upstream of the web holder. These rollers can be configured to incrementally and systematically crease certain portions of the web 200W to prepare those portions to be folded and bonded with bonding elements as described below, later in the process. This additional folding can add strength and integrity to the finished three dimensional article.

As mentioned above, the forming portion 120 includes a forming portion frame 120F. The vacuum plates are mounted to that frame via a base 25. The frame 120F is further joined with one or more slide bars 140. The system can be actuated so as to initiate movement of the frame 120F, along with the slide bars, in direction N so that the vacuum plates move in direction M3 cooperatively with one another, while holding the sheet 200 in the three dimensional contoured shape 209 of an article against their surfaces. The entire frame 120F and slide bars 140 can move in unison with one another in direction M3 toward the second forming portion 130. This movement is shown in FIGS. 18-19 with the frame 120F moving in direction N.

When the frame 120F and slide bars 140 move in direction N, a forming mode as shown in FIGS. 20 and 21 is initiated. In the forming mode, the vacuum plates of the first forming portion 120 can be received within the contoured mold 132 and its respective walls, with the sheet of film 200 in its three dimensional contoured shape 209 disposed and sandwiched therebetween. Optionally, the contoured mold in the first forming portion 130 can be held in a fixed horizontal orientation via the frame 150 which is secured to the respective vertical slide bars 160 during the movement of the first forming portion 120 and its components toward the contoured mold 132.

After the vacuum plates of the first forming portion 120 are brought into close proximity to the walls of the second portion 130, optionally engaging the same with the sheet therebetween, the respective corners of the article, similar to that of the article described in the current embodiment above, can be bonded with bonding elements 151 exerting heat on those corners, and fusing together adjacent and overlapped portions of the sheet, again similar to the process in the embodiments above.

Figure 22:
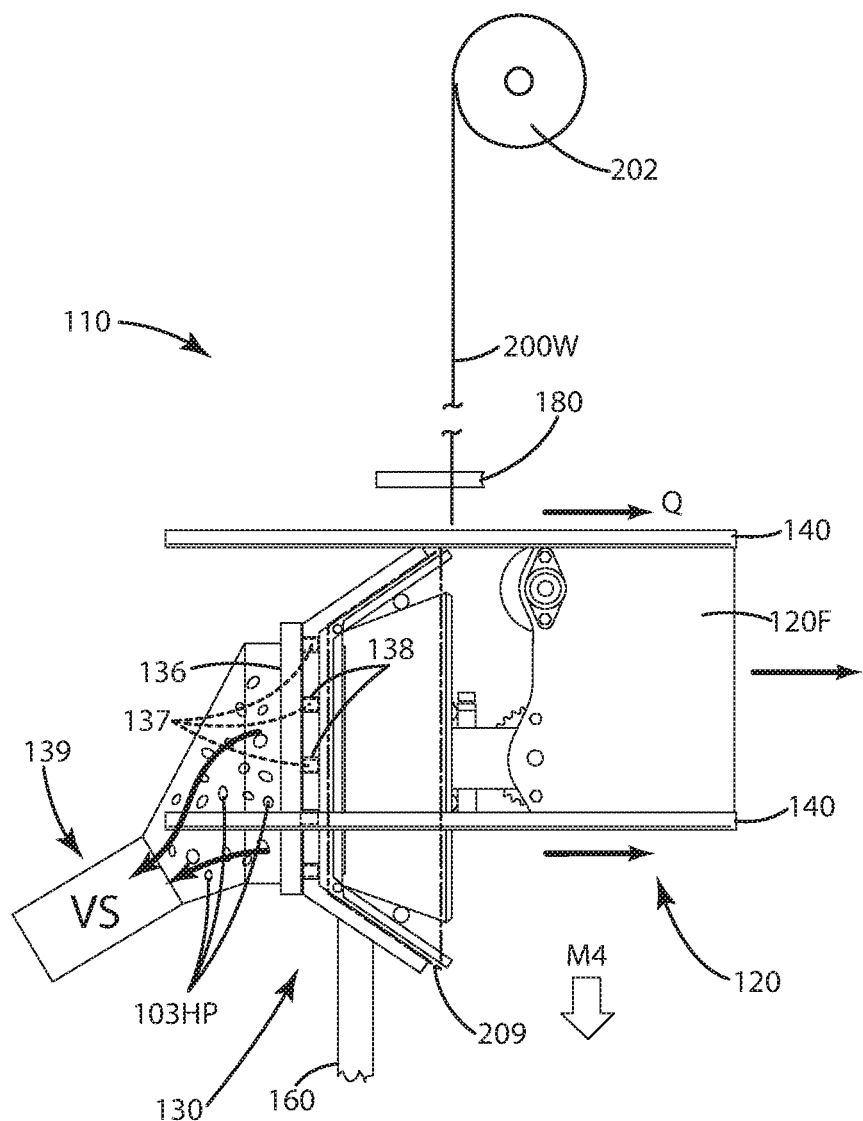
FIG. 22 is a side view of the second forming portion coupled die cutting filter holes in the formed three dimensional article with the fourth alternative embodiment.
Figure 23:
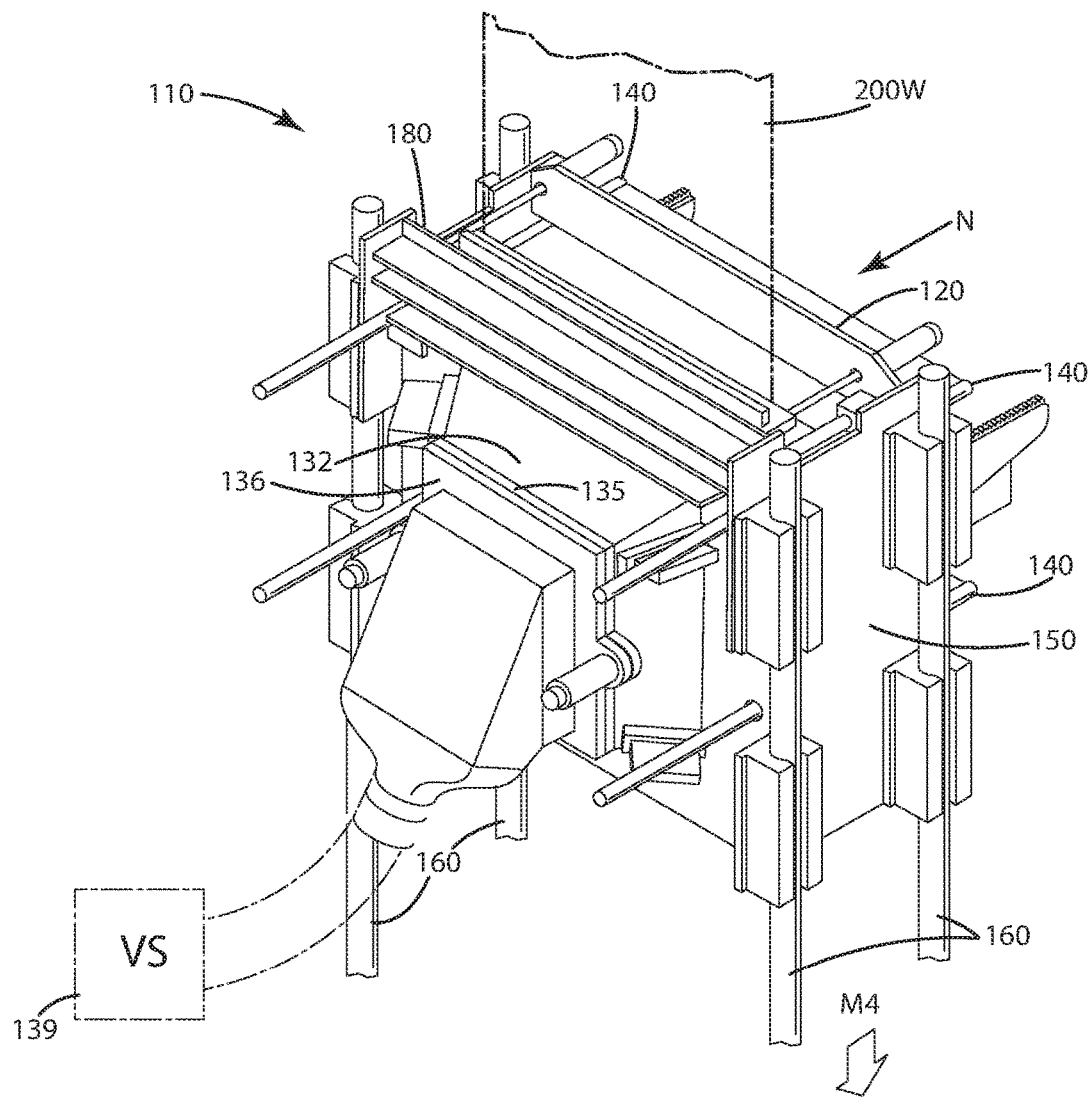
FIG. 23 is a perspective view of the articulating vacuum plate system of the fourth alternative embodiment with an air supply in communication with a contoured mold of the second forming portion.

With the sheet of film 200 formed into the three dimensional contoured shape 209, and its portions bonded together respective corners, the sheet optionally can be die cut to form holes like those of the holes 103H in FIG. 2 and described in the embodiments above. To form the holes, the plate 136 including die cut tubes 137 can be moved so that the tubes enter the openings 138, as shown in FIGS. 22 and 23. Upon this movement, the die cut tubes 137 engage and cut the three dimensional contoured film 209 in the contoured mold 132. Upon this cutting action, cut out parts 103HP are formed. Rather than leaving these cut out parts associated with the article 209, the system 110 can be actuated so that a vacuum 139 draws a negative pressure in the die cut tubes to thereby remove the parts 103HP formed during the die cutting operation. These parts can be collected and recycled depending on the application. After the parts are removed, the plate 136 can retract the die cut tubes 137 from the openings 138 to a withdrawn position. The movement of the plate and die cut tubes can be performed via actuators 139A, as described above.

After the sheet is formed, and optionally die cut to form holes therein, the first forming portion frame 120F can be moved horizontally in direction Q away from the contoured mold 132. While this horizontal movement in direction Q is occurring, the frame 150, with the first forming portion and second forming portion mounted thereto, simultaneously can be moved vertically in direction M4. Thus, the first mounting portion frame 120F moves in a horizontal direction or first direction Q relative to the contoured mold of the second forming portion 130, simultaneous with vertical movement of the entire frame, with both of the first and second forming portions thereon moving in direction M4. This can be further understood with reference to FIG. 24.

Figure 24:
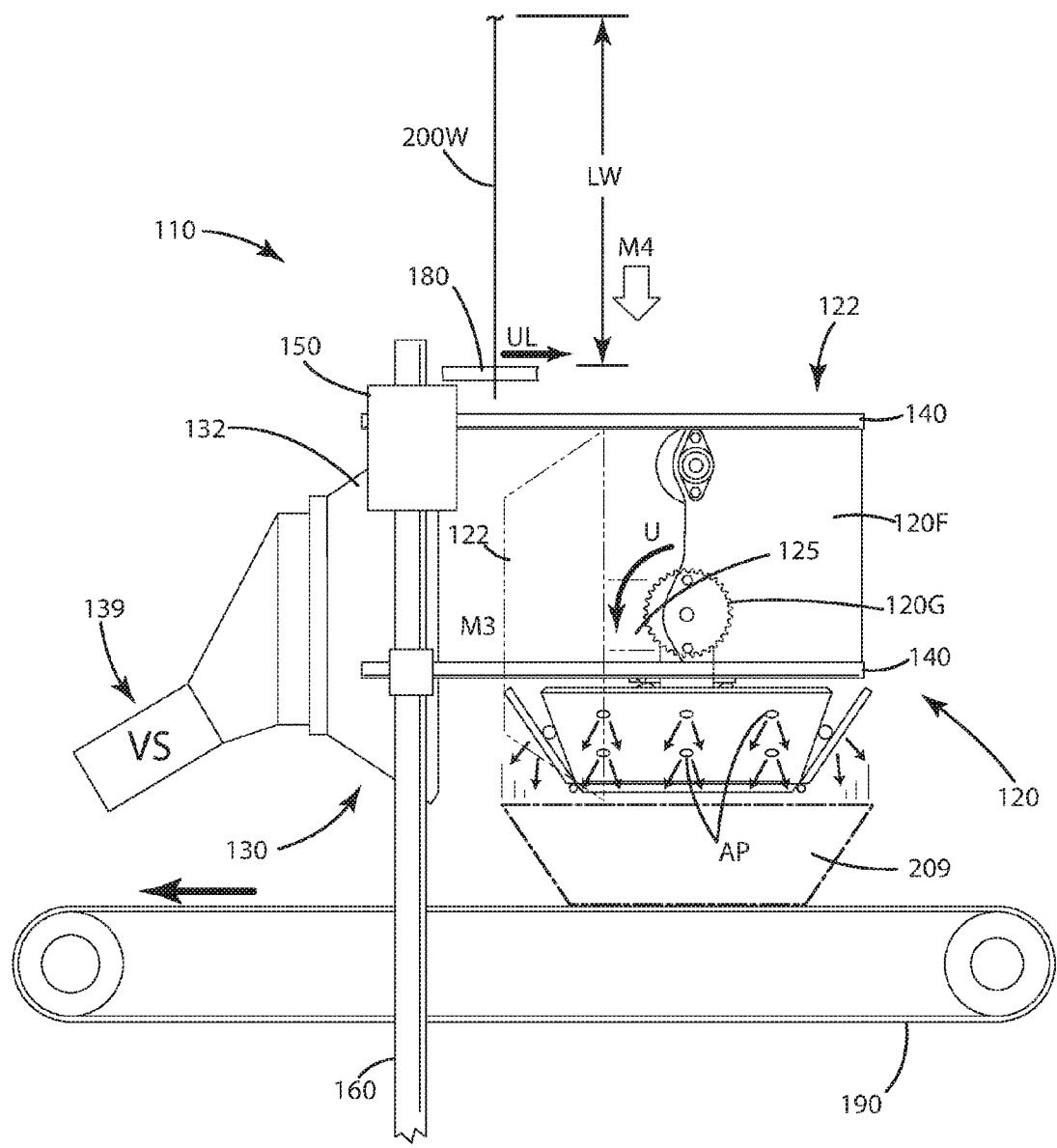
FIG. 24 is a side view of the articulating vacuum plate system of the fourth alternative embodiment with its components moving simultaneously to offload a finished three dimensional article.

Optionally, during the movement of the frame 150, first forming portion 120 and second forming portion 130 in direction M4, the vacuum plates and baseplate of the first forming portion 120 can rotate in direction U from a generally vertical configuration as shown in FIG. 22 to a horizontal configuration as shown in FIG. 24. This movement can be carried out via gears 120G associated with the frame 120F that rotate the vacuum plates and an associated support 125 about an arcuate path.

When the frame 150 reaches its bottom position, the first forming portion 120 and in particular the vacuum plates can be operated so that a negative pressure is no longer exerted on the now formed and three dimensional contoured sheet or article 209. Optionally, the respective air ports AP in the various components of the vacuum plates and baseplate can be actuated under a positive pressure, effectively blowing the formed three dimensional article off those respective plates and the respective vacuum surface. Accordingly, the formed three dimensional contoured sheet 209 can drop onto a conveyor 190 of the system 110. The conveyor 190 can move in direction Y to advance the finished sheet with a net three dimensional final shape to the next processing steps, which can be packaging and the like.

After the finished article 209 is blown off the vacuum surfaces of the first forming portion 120, the frame 150, and first and second forming portions 120, 130 can move in a direction opposite M4. Simultaneously, the vacuum plates can move a direction opposite the direction U, back to a generally vertical, flat two dimensional configuration. The frame 150 can move upward until it achieves again the configuration shown in FIG. 17. The respective plates themselves also can move in directions opposite R2 to achieve the flat two dimensional configuration. The web 200W can be advanced again so that sheet 200 is again placed adjacent the vacuum surfaces of the first forming portion 120. From there, the process can be repeated again as described above.

Optionally, the web holder 180 can assist in advancing the web in a specific increment that corresponds to the overall length of a sheet to be formed into a three dimensional article. For example, as mentioned above, after the web 200W is cut to form a sheet 200, shown in FIGS. 16-18, the holder 180 continues to hold and clamp the end of the web 200W. This holding can continue throughout movement of the frame 150 through a downward stroke of the system. As shown in FIG. 20, the web holder 180 continues to hold the web 200W as the frame 150 and first and second forming portions move downward in direction M4. As shown in FIG. 22, upon this downward movement in direction M4, the web holder 180 pulls the web 200W downward with the other components of the system. With this pulling movement, the web spools off the roll 202. The web 200W also is advanced a distance LW, as shown in FIG. 24. This distance LW can correspond to a desired length of a subsequent sheet to be formed with the system. For example, the distance can be optionally about 12 inches to about 36 inches, further optionally about 12 inches to about 24 inches, and even further optionally about 24 inches. Of course the distance can change depending on the particular article to be formed and its dimensions.

Upon reaching the bottom of the stroke, the web holder 180 can release the web 200W by moving a part in direction UL. At this point, the frame and associated first and second forming portions can move in a direction opposite M4, back up to a position as shown in FIG. 17. During this movement, the web holder 180 can be deactivated so that the web 200W freely moves between its parts. When the system achieves the configuration shown in FIG. 17, however, the web holder 180 can be actuated and move in direction L. In so doing, it again clamps the web 200W for formation of the next article from a sheet of film. The process then can be repeated with that next sheet.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of forming a three dimensional article comprising:
    providing a first vacuum plate and a second vacuum plate arranged in a first mode in which the first vacuum plate and the second vacuum plate are configured to cooperatively form a generally planar, two dimensional surface, each vacuum plate including a plurality of vacuum ports and an internal vacuum chamber, each vacuum chamber of each vacuum plate being separate and independent from the other vacuum chamber, each vacuum plate being in fluid communication with a vacuum source;
    loading a film on the first and second vacuum plates with the first and second vacuum plates in the first mode, so that the film is adjacent the two dimensional surface and so that the film is in a generally planar, two dimensional form;
    applying a vacuum through the plurality of vacuum ports to draw the film toward the two dimensional surface;
    articulating the first and second vacuum plates so that the plates cooperatively transition to a second mode in which the film transitions from the generally planar, two dimensional form to a three dimensional form;
    moving the film on the first and second vacuum plates relative to a contoured mold having a three dimensional net shape; and
    engaging the film against the contoured mold to configure the film into the three dimensional net shape,
    wherein the contoured mold is in the form of a hood disposed adjacent the first and second vacuum plates when in the first mode,
    wherein the first and second vacuum plates move into at least a portion of the hood during the moving step.

2. The method of claim 1 comprising:
    removing the film having the three dimensional net shape from the first and second vacuum plates and the contoured mold.

3. The method of claim 2, wherein during the articulating step the vacuum is simultaneously applied through the vacuum ports in the first and second vacuum plates to hold the film proximal to the first and second vacuum plates.

4. The method of claim 1,
    wherein the first and second vacuum plates are pivotally joined with a base plate,
    wherein during the articulating step, the first vacuum plate moves relative to the base simultaneous with the second vacuum plate moving relative to the base.

5. The method of claim 1,
    wherein the first and second vacuum plates articulate relative to one another so that preselected portions of the first and second vacuum plates move toward one another.

6. The method of claim 5 wherein the first and second vacuum plates articulate simultaneously as the first and second vacuum plates move into the at least a portion of the hood during the moving step.

7. A method of forming a three dimensional article comprising:
    providing a first vacuum plate and a second vacuum plate arranged in a first mode in which the first vacuum plate and the second vacuum plate are configured to cooperatively form a generally planar, two dimensional surface, each vacuum plate including a plurality of vacuum ports and an internal vacuum chamber, each vacuum chamber of each vacuum plate being separate and independent from the other vacuum chamber, each vacuum plate being in fluid communication with a vacuum source;
    loading a film on the first and second vacuum plates with the first and second vacuum plates in the first mode, so that the film is adjacent the two dimensional surface and so that the film is in a generally planar, two dimensional form;
    applying a vacuum through the plurality of vacuum ports to draw the film toward the two dimensional surface;
    articulating the first and second vacuum plates so that the plates cooperatively transition to a second mode in which the film transitions from the generally planar, two dimensional form to a three dimensional form;
    moving the film on the first and second vacuum plates relative to a contoured mold having a three dimensional net shape; and
    engaging the film against the contoured mold to configure the film into the three dimensional net shape,
    wherein the film is engaged against the contoured mold, the film remains engaged with the first and second vacuum plates while the vacuum is applied.

8. A method of forming a three dimensional article comprising:
    providing a first vacuum plate and a second vacuum plate that cooperatively form a vacuum surface that is at least one of a two dimensional surface and a three dimensional surface, each vacuum plate including a plurality of vacuum ports;
    loading a film on the first and second vacuum plates in a first mode so that the film is adjacent the two dimensional surface and so that the film in of a form that is at least one of a planar, two dimensional form and a first three dimensional form;

applying a vacuum through the plurality of vacuum ports to draw the sheet toward the vacuum surface;

articulating at least one of the first and second vacuum plates relative to the other so that the plates cooperatively transition to a second mode, in which the film transitions from the form of the at least one of a planar, two dimensional form and a first three dimensional form, to at least one of a three dimensional form and a second three dimensional form, respectively, while the vacuum continues to be applied via the plurality of vacuum ports of the respective first and second vacuum plates, moving the film on the first and second vacuum plates toward a contoured mold in the form of a hood having a three dimensional net shape; and engaging the film against an interior surface of the hood to configure the film into the three dimensional net shape, whereby the film takes on the at least one of a three dimensional form and a second three dimensional form to produce the three dimensional article.

9. The method of claim 8,
wherein the film is in the form of a sheet having a plurality of edges,
wherein the at least two of the plurality of edges are overlapped with one another when the film is in the three dimensional net shape.

10. The method of claim 9 comprising applying heat to the at least two edges of the plurality of edges to bond the at least two edges together and form a corner of a litter sieve.

11. The method of claim 8 wherein the film includes a plurality of edges, comprising overlapping preselected ones of the plurality of edges and bonding the overlapped edges to one another to form a corner in the three dimensional form.

12. The method of claim 8,
wherein negative air pressure is applied through the plurality of vacuum ports,
wherein no positive air pressure, other than ambient air pressure, is applied to the film to form the three dimensional article.

13. The method of claim 8,
wherein the film is a polymeric film,
wherein the first and second vacuum plates articulate relative to a base plate at respective first and second hinges,
wherein the polymeric film bends adjacent the hinges during the articulating step so that the film takes on the at least one of a three dimensional form and a second three dimensional form.

14. The method of claim 8,
wherein the first and second vacuum plates articulate relative to one another at a hinge,
wherein the film bends adjacent the hinge during the articulating step so that the film takes on the at least one of a three dimensional form and a second three dimensional form.

15. The method of claim 8 comprising heating a first portion of the film so as to bond the first portion with a second portion of the film and thereby lock the film in the three dimensional form.

16. A method of forming a three dimensional article comprising:
providing a first vacuum plate and a second vacuum plate that cooperatively form a vacuum surface that is at least one of a two dimensional surface and a three dimensional surface, each vacuum plate including a plurality of vacuum ports;

loading a film on the first and second vacuum plates in a first mode so that the film is adjacent the two dimensional surface and so that the film in of a form that is at least one of a planar, two dimensional form and a first three dimensional form;

applying a vacuum through the plurality of vacuum ports to draw the sheet toward the vacuum surface;

articulating at least one of the first and second vacuum plates relative to the other so that the plates cooperatively transition to a second mode, in which the film transitions from the form of the at least one of a planar, two dimensional form and a first three dimensional form, to at least one of a three dimensional form and a second three dimensional form, respectively, while the vacuum continues to be applied via the plurality of vacuum ports of the respective first and second vacuum plates; and moving the film on the first and second vacuum plates toward a contoured mold in the form of a hood having a three dimensional net shape so that as the film enters the hood, the film is sandwiched between the first and second vacuum plates and the hood, whereby the film takes on the at least one of a three dimensional form and a second three dimensional form to produce the three dimensional article.

17. The method of claim 16,
wherein the first and second plates are pivotally joined with a base plate,
wherein the film is in the planar, two dimensional form in the loading step,
wherein the first and second vacuum plates pivot relative to the base plate, so that the film bends, thereby causing the film to take on the three dimensional form.

18. An apparatus for forming a three dimensional article from a sheet of film, the apparatus comprising:
a first vacuum plate;
a second vacuum plate joined with the first vacuum plate so that the first vacuum plate and the second vacuum plate are configurable in a first mode in which the first vacuum plate and the second vacuum plate cooperatively form a vacuum surface configured to apply a negative air pressure; and
a contoured mold having a three dimensional net shape disposed adjacent the first and second vacuum plates and adapted to selectively receive at least a portion of the first vacuum plate while a film is held against the vacuum surface;
wherein each of the first and second vacuum plates includes a plurality of vacuum ports and an internal vacuum chamber,
wherein each vacuum chamber of each of the first and second vacuum plates is separate and independent from the other vacuum chamber,
wherein each of the first and second vacuum plates is in fluid communication with a vacuum source;
wherein the first and second vacuum plates in the first mode are adapted to support the film adjacent the vacuum surface and so that the film is in at least one of a generally planar, two dimensional form and a first three dimensional form;
wherein the first and second vacuum plates are each configurable in a second mode in which the film transitions from the at least one of a generally planar, two dimensional form and a first three dimensional form, to respectively, at least one of a three dimensional form and a second three dimensional form, wherein the first and second vacuum plates are configured to not apply a positive air pressure to the film while configured in the second mode, wherein the contoured mold is in the form of a hood disposed adjacent the first and second vacuum plates when in the first mode, wherein the first and second vacuum plates are positioned adjacent and arranged to move into at least a portion of the hood.

* * * * *